US012804414B2

(12) United States Patent
Kim et al.

(10) Patent No.: US 12,804,414 B2
(45) Date of Patent: Nov. 17, 2026

(54) METHOD OF GENERATING CONTOURS OF PROTECTED AREA FOR FREQUENCY SHARING AND APPARATUS PERFORMING THE SAME

(71) Applicant: ELECTRONICS AND TELECOMMUNICATIONS RESEARCH INSTITUTE, Daejeon (KR)

(72) Inventors: Bong-Su Kim, Daejeon (KR); Seung Keun Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 288 days.

(21) Appl. No.: 18/676,902

(22) Filed: May 29, 2024

(65) Prior Publication Data

US 2025/0106645 A1 Mar. 27, 2025

(30) Foreign Application Priority Data

Sep. 26, 2023 (KR) ........................ 10-2023-0129635

(51) Int. Cl.

*H04W 16/14* (2009.01)
*H04B 17/336* (2015.01)
*H04W 28/02* (2009.01)

(52) U.S. Cl.

CPC .......... *H04W 16/14* (2013.01); *H04B 17/336* (2015.01); *H04W 28/0236* (2013.01)

(58) Field of Classification Search

CPC . H04W 16/14; H04W 28/0236; H04W 16/18; H04W 24/02; H04W 24/08; H04B 17/336

See application file for complete search history.

(56) References Cited

U.S. PATENT DOCUMENTS 10,187,183 B2 * 1/2019 Islam ........................ H04L 1/16
11,234,135 B2 1/2022 Macmullan et al.

(Continued)

FOREIGN PATENT DOCUMENTS

JP 2021-150743 A 9/2021
KR 10-1865227 B1 6/2018

(Continued)

OTHER PUBLICATIONS

Liu Songtao et al., "Automatic radar antenna scan type recognition based on limited penetrable visibility graph," Journal of Systems Engineering and Electronics, May 12, 2021, https://ieeexplore.ieee.org/document/9430118.

*Primary Examiner* — Afshawn M Towfighi

(57) ABSTRACT

A method of generating a protected area contour for frequency sharing is disclosed. The method of generating a protected area contour for frequency sharing, according to an embodiment, may include: calculating, for a first wireless station, an interference-to-noise ratio (INR) that is an effect of interference by a second wireless station sharing a frequency band with the first wireless station; setting an analysis area in which the interference is predicted to occur in a surrounding area of the first wireless station based on the INR; and generating a protected area contour of the first wireless station based on the analysis area and the INR.

20 Claims, 25 Drawing Sheets

(56) References Cited

U.S. PATENT DOCUMENTS

| | | | | |
|---|---|---|---|---|
| 11,722,907 | B2 | 8/2023 | Um et al. | |
| 2008/0274759 | A1* | 11/2008 | Chen | H04W 72/30 455/507 |
| 2009/0069026 | A1* | 3/2009 | Cho | H04W 72/542 455/450 |
| 2016/0183304 | A1* | 6/2016 | Fischer | H04B 17/318 370/278 |
| 2023/0147824 | A1 | 5/2023 | Borges et al. | |
| 2023/0247439 | A1 | 8/2023 | Kim | |

FOREIGN PATENT DOCUMENTS

| | | | |
|---|---|---|---|
| KR | 10-2021-0048815 | A | 5/2021 |
| KR | 10-2021-0111156 | A | 9/2021 |
| KR | 10-2023-0026084 | A | 2/2023 |
| KR | 10-2765218 | B1 | 2/2025 |

* cited by examiner 610 620 630 640 650

| | 127 | 127.1 | 127.2 | 127.3 | 127.4 | 127.5 | 127.6 | 127.7 | 127.8 | 127.9 | 128 | 128.1 | 128.2 |
|---|---|---|---|---|---|---|---|---|---|---|---|---|---|
| 37 | -44 | -35 | -48 | -38 | -44 | -36 | -38 | -33 | -44 | -41 | -44 | -44 | -44 |
| 36.9 | -33 | -30 | -43 | -41 | -43 | -41 | -33 | -34 | -32 | -31 | -37 | -33 | -37 |
| 36.8 | -44 | -41 | -35 | -48 | -38 | -44 | -26 | -22 | -28 | -34 | -41 | -44 | -41 |
| 36.7 | -32 | -31 | -43 | -41 | -33 | -41 | -25 | -11 | -24 | -32 | -38 | -32 | -38 |
| 36.6 | -28 | -34 | -41 | -41 | -33 | -44 | -40 | -9 | -25 | -26 | -34 | -28 | -41 |
| 36.5 | -24 | -32 | -35 | -48 | -38 | -33 | -22 | -7 | -16 | -22 | -26 | -24 | -38 |
| 36.4 | -25 | -26 | -34 | -32 | -31 | -26 | -7 | -6 | -17 | -26 | -25 | -25 | -37 |
| 36.3 | -31 | -22 | -31 | -28 | -34 | -22 | -9 | -3 | -14 | -18 | -11 | -21 | -33 |
| 36.2 | -26 | -26 | -35 | -22 | -21 | -15 | -6 | 1 | -9 | -17 | -22 | -26 | -29 |
| 36.1 | -25 | -22 | -11 | -14 | -17 | -7 | -5 | 0 | -8 | -11 | -17 | -24 | -26 |
| 36 | -22 | -24 | -15 | -6 | -5 | -3 | 1 | 3 | 0 | -9 | -15 | -22 | -26 |
| 35.9 | -21 | -26 | -19 | -5 | -3 | 1 | 0 | -4 | -7 | -13 | -14 | -21 | -33 |
| 35.8 | -27 | -26 | -12 | -8 | | -7 | -3 | -8 | -15 | -15 | -18 | -27 | -25 |
| 35.7 | -39 | -27 | -17 | -7 | -13 | -12 | -8 | -9 | -6 | -22 | -25 | -28 | -25 |
| 35.6 | -34 | -29 | -18 | -18 | -15 | -7 | -15 | -13 | -18 | -18 | -22 | -22 | -23 |
| 35.5 | -22 | -20 | -29 | -24 | -22 | -9 | -22 | -20 | -29 | -24 | -22 | -22 | -22 |
| 35.4 | -36 | -25 | -33 | -33 | -20 | -15 | -18 | -25 | -33 | -33 | -26 | -28 | -27 |
| 35.3 | -24 | -22 | -27 | -44 | -24 | -26 | -24 | -22 | -27 | -44 | -24 | -24 | -24 |
| 35.2 | -33 | -30 | -43 | -41 | -33 | -33 | -33 | -30 | -43 | -41 | -33 | -33 | -33 |
| 35.1 | -44 | -35 | -48 | -38 | -44 | -36 | -44 | -35 | -48 | -38 | -44 | -44 | -44 |
| 35 | -41 | -33 | -44 | -40 | -41 | -34 | -41 | -33 | -44 | -40 | -41 | -41 | -41 |

FIG. 6A

| | 127 | 127.1 | 127.2 | 127.3 | 127.4 | 127.5 | 127.6 | 127.7 | 127.8 | 127.9 | 128 | 128.1 | 128.2 |
|---|---|---|---|---|---|---|---|---|---|---|---|---|---|
| 37 | -44 | -35 | -48 | -38 | -44 | -36 | -38 | -33 | -44 | -41 | -44 | -44 | -44 |
| 36.9 | -33 | -30 | -43 | -41 | -43 | -41 | -33 | -34 | -32 | -31 | -37 | -33 | -37 |
| 36.8 | -44 | -41 | -35 | -48 | -38 | -44 | -26 | -22 | -28 | -34 | -41 | -44 | -41 |
| 36.7 | -32 | -31 | -43 | -41 | -33 | -41 | -25 | -11 | -24 | -32 | -38 | -32 | -38 |
| 36.6 | -28 | -34 | -41 | -41 | -33 | -44 | -40 | -9 | -25 | -26 | -34 | -28 | -41 |
| 36.5 | -24 | -32 | -35 | -48 | -38 | -33 | -22 | -7 | -16 | -22 | -26 | -24 | -38 |
| 36.4 | -25 | -26 | -34 | -32 | -31 | -26 | -7 | -6 | -17 | -26 | -25 | -25 | -37 |
| 36.3 | -31 | -22 | -31 | -28 | -34 | -22 | -9 | -3 | -14 | -18 | -11 | -21 | -33 |
| 36.2 | -26 | -26 | -35 | -22 | -21 | -15 | -6 | 1 | -9 | -17 | -22 | -26 | -29 |
| 36.1 | -25 | -22 | -11 | -14 | -17 | -7 | -5 | 0 | -8 | -11 | -17 | -24 | -26 |
| 36 | -22 | -24 | -15 | -6 | -5 | -3 | 1 | 3 | 0 | -9 | -15 | -22 | -26 |
| 35.9 | -21 | -26 | -19 | -5 | -3 | 1 | 0 | -4 | -7 | -13 | -14 | -21 | -33 |
| 35.8 | -27 | -26 | -12 | -8 | | -7 | -3 | -8 | -15 | -15 | -18 | -27 | -25 |
| 35.7 | -39 | -27 | -17 | -7 | -13 | -12 | -8 | -9 | -6 | -22 | -25 | -28 | -25 |
| 35.6 | -34 | -29 | -18 | -18 | -15 | -7 | -15 | -13 | -18 | -18 | -22 | -22 | -23 |
| 35.5 | -22 | -20 | -29 | -24 | -22 | -9 | -22 | -20 | -29 | -24 | -22 | -22 | -22 |
| 35.4 | -36 | -25 | -33 | -33 | -20 | -15 | -18 | -25 | -33 | -33 | -26 | -28 | -27 |
| 35.3 | -24 | -22 | -27 | -44 | -24 | -26 | -24 | -22 | -27 | -44 | -24 | -24 | -24 |
| 35.2 | -33 | -30 | -43 | -41 | -33 | -33 | -33 | -30 | -43 | -41 | -33 | -33 | -33 |
| 35.1 | -44 | -35 | -48 | -38 | -44 | -36 | -44 | -35 | -48 | -38 | -44 | -44 | -44 |
| 35 | -41 | -33 | -44 | -40 | -41 | -34 | -41 | -33 | -44 | -40 | -41 | -41 | -41 |

670

660

FIG. 6B

| | 127 | 127.1 | 127.2 | 127.3 | 127.4 | 127.5 | 127.6 | 127.7 | 127.8 | 127.9 | 128 | 128.1 | 128.2 |
|---|---|---|---|---|---|---|---|---|---|---|---|---|---|
| 37 | -44 | -35 | -48 | -38 | -44 | -36 | -38 | -33 | -44 | -41 | -44 | -44 | -44 |
| 36.9 | -33 | -30 | -43 | -41 | -43 | -41 | -33 | -34 | -32 | -31 | -37 | -33 | -37 |
| 36.8 | -44 | -41 | -35 | -48 | -38 | -44 | -26 | -22 | -28 | -34 | -41 | -44 | -41 |
| 36.7 | -32 | -31 | -43 | -41 | -33 | -41 | -25 | -11 | -24 | -32 | -38 | -32 | -38 |
| 36.6 | -28 | -34 | -41 | -41 | -33 | -44 | -40 | -9 | -25 | -26 | -34 | -28 | -41 |
| 36.5 | -24 | -32 | -35 | -48 | -38 | -33 | -22 | -7 | -16 | -22 | -26 | -24 | -38 |
| 36.4 | -25 | -26 | -34 | -32 | -31 | -26 | -7 | -6 | -17 | -26 | -25 | -25 | -37 |
| 36.3 | -31 ⇩ | -22 | -31 | -28 | -34 | -22 | -9 | -3 | -14 | -18 | -11 | -21 | -33 |
| 36.2 | -26 | -26 | -35 | -22 | -21 | -15 | -6 | 1 | -9 | -17 | -22 | -26 | -29 |
| 36.1 | -25 | -22 | -11 | -14 | -17 | -7 | -5 | 0 | -8 | -11 | -17 | -24 | -26 |
| 36 | -22 | -24 | -15 | -6 | -5 | -3 | 1 | 3 | 0 | -9 | -15 | -22 | -26 |
| 35.9 | -21 | -26 | -19 | -5 | -3 | 1 | 0 | -4 | -7 | -13 | -14 | -21 | -33 |
| 35.8 | -27 | -26 | -12 | -8 | | -7 | -3 | -8 | -15 | -15 | -18 | -27 | -25 |
| 35.7 | -39 | -27 | -17 | -7 | -13 | -12 | -8 | -9 | -6 | -22 | -25 | -28 | -25 |
| 35.6 | -34 | -29 | -18 | -18 | -15 | -7 | -15 | -13 | -18 | -18 | -22 | -22 | -23 |
| 35.5 | -22 | -20 | -29 | -24 | -22 | -9 | -22 | -20 | -29 | -24 | -22 | -22 | -22 |
| 35.4 | -36 | -25 | -33 | -33 | -20 | -15 | -18 | -25 | -33 | -33 | -26 | -28 | -27 |
| 35.3 | -24 | -22 | -27 | -44 | -24 | -26 | -24 | -22 | -27 | -44 | -24 | -24 | -24 |
| 35.2 | -33 | -30 | -43 | -41 | -33 | -33 | -33 | -30 | -43 | -41 | -33 | -33 | -33 |
| 35.1 | -44 | -35 | -48 | -38 | -44 | -36 | -44 | -35 | -48 | -38 | -44 | -44 | -44 |
| 35 | -41 | -33 | -44 | -40 | -41 | -34 | -41 | -33 | -44 | -40 | -41 | -41 | -41 |

| | | | |
|---|---|---|---|
| -8 | -9 | -20 | -24 |
| -9 | -10 | -10 | -15 |
| -9 | -13 | -11 | -13 |
| -16 | -19 | -19 | -20 |

1170

1160

1130

FIG. 11

[Relay station at Mt. AA, 000, Seoul]

[Relay station at Mt. BB, 000, Daejeon]

1700

METHOD OF GENERATING CONTOURS OF PROTECTED AREA FOR FREQUENCY SHARING AND APPARATUS PERFORMING THE SAME

CROSS-REFERENCE TO RELATED APPLICATIONS

This application claims the benefit under 35 USC § 119 (a) of Korean Patent Application No. 10-2023-0129635 filed on Sep. 26, 2023, in the Korean Intellectual Property Office, the entire disclosure of which is incorporated herein by reference for all purposes.

BACKGROUND

1. Field

The following description relates to a method of generating a contour of a guard zone (or a "protected area" herein) for frequency sharing and an apparatus performing the method.

2. Description of Related Art

For frequency bands, techniques may be applied to share a frequency band while ensuring that a primary service, which is an existing service, does not experience an interference effect of an allowed value or more from a secondary service, which is an unlicensed service. For example, for a frequency band of 479 megahertz (MHz) to 698 MHz for television (TV) broadcasting, a technique may be employed to allow a new wireless station to use the same or adjacent frequency band at a location separated from a broadcast service area by a distance with which a TV receiver is unaffected. In the United States of America (shortly the US herein), for a frequency band of 3.55 gigahertz (GHz) to 3.7 GHZ, which is operated for radar systems as a primary service, the citizens broadband radio service (CBRS) is used to enable frequency band sharing using three layers. In Korea, for a fixed wireless station and public frequency service band of 4.72 GHz to 4.82 GHZ, an e-Um 5G service based on an analysis of an interference effect is used. Recently, for a band of 5925 MHz to 7125 MHz, sharing frequency, or joint use of frequency, is under review. Such a 6 GHz band (e.g., the band of 5925 MHz to 7125 MHz) is distributed and used worldwide for fixed communications, fixed broadcast relay, and fixed satellite uplinks. In some countries, it is also used for a mobile broadcast relay service.

The above description is information the inventor(s) acquired during the course of conceiving the present disclosure, or already possessed at the time, and is not necessarily art publicly known before the present application was filed.

SUMMARY

An aspect may provide a technique for generating a guard zone contour (also herein a "protected area contour") that allows a secondary service, which is an unlicensed service, to jointly use frequencies without interference with an existing primary service.

An aspect may provide a technique for setting an exclusion area to ensure that no interferer exists within a fixed distance from the location of a receiver of a primary service wireless station.

An aspect may provide a technique for generating a protected area contour based on a desired signal of a primary service wireless station.

However, the technical challenges are not limited to those described above, and other technical challenges may exist.

According to an embodiment, there is provided a method of generating a protected area contour for frequency sharing, the method including: calculating an interference-to-noise ratio (INR) that is an effect of interference with a first wireless station by a second wireless station sharing a frequency band with the first wireless station; setting an analysis area in which the interference is predicted to occur in a surrounding area of the first wireless station based on the INR; and generating a protected area contour of the first wireless station based on the analysis area and the INR.

The INR may include an INR calculated based on a desired received signal level of the first wireless station.

The setting of the analysis area may include: scanning the surrounding area based on a location of the first wireless station; obtaining the INR of the surrounding area; detecting a first area in the surrounding area having the INR greater than a predetermined value; and setting the analysis area based on a location of the first area.

The scanning may include: selecting at least one method from a linear scanning method of scanning the surrounding area linearly with respect to the first wireless station and a circular scanning method of scanning the surrounding area radially with respect to the first wireless station, and performing the scanning by the selected method.

The circular scanning method may be a method of uniformly radially scanning the surrounding area based on a predetermined distance resolution and angular resolution, in a circular area with the location of the first wireless station as a center point.

The angular resolution may be a first angular resolution for a first area in the surrounding area corresponding to a main beam direction of the first wireless station; and a second angular resolution, which is greater than the first angular resolution, for an area in the surrounding area from which the first area is excluded.

The analysis area may include a rectangular analysis area and a polygonal analysis area.

The generating of the protected area contour may include: in response to the second wireless station including a plurality of wireless stations with different ground elevations, simultaneously generating protected area contours of the first wireless station for the plurality of wireless stations.

The setting of the analysis area may include: in response to the circular scanning method being selected, detecting a second area in the surrounding area having the INR less than the predetermined value; and setting the analysis area excluding the second area.

The method may further include: in response to the second wireless station being a mobile wireless station whose location is not specifiable, restricting use of the frequency band by the second wireless station.

The generating of the protected area contour may include: in response to an aimed orientation of an antenna of the first wireless station not being specifiable, generating the protected area contour based on a beam tilt angle of the antenna.

According to an embodiment, there is provided a method of generating a protected area contour for frequency sharing, the method including: determining a fixed distance to exclude a second wireless station which is an interferer, based on morphological information of a location of a first wireless station which is a victim; and generating a contour of an area having the fixed distance as a radius with respect to the first wireless station.

According to an embodiment, there is provided an apparatus configured to generate a protected area contour for frequency sharing, the apparatus including: a memory including instructions; and a processor electrically connected to the memory and configured to execute the instructions. When the instructions are executed by the processor, the processor may be configured to control a plurality of operations, and the plurality of operations may include: calculating an INR that is an effect of interference with a first wireless station by a second wireless station sharing a frequency band with the first wireless station; setting an analysis area in which the interference is predicted to occur in a surrounding area of the first wireless station based on the INR; and generating a protected area contour of the first wireless station based on the analysis area and the INR.

The INR may include an INR calculated based on a desired received signal level of the first wireless station.

The setting of the analysis area may include: scanning the surrounding area based on a location of the first wireless station; obtaining the INR of the surrounding area; detecting a first area in the surrounding area having the INR greater than a predetermined value; and setting the analysis area based on a location of the first area.

The scanning may include: selecting at least one method from a linear scanning method of scanning the surrounding area linearly with respect to the first wireless station and a circular scanning method of scanning the surrounding area radially with respect to the first wireless station, and performing the scanning by the selected method.

The circular scanning method may be a method of uniformly radially scanning the surrounding area based on a predetermined distance resolution and angular resolution, in a circular area with the location of the first wireless station as a center point.

The angular resolution may be a first angular resolution for a first area in the surrounding area corresponding to a main beam direction of the first wireless station; and a second angular resolution, which is greater than the first angular resolution, for an area in the surrounding area from which the first area is excluded.

The analysis area may include: a rectangular analysis area and a polygonal analysis area.

The generating of the protected area contour may include: in response to the second wireless station including a plurality of wireless stations with different ground elevations, simultaneously generating protected area contours of the first wireless station for the plurality of wireless stations.

The setting of the analysis area may include: in response to the circular scanning method being selected, detecting a second area in the surrounding area having the INR less than the predetermined value; and setting the analysis area excluding the second area.

The plurality of operations may further include: in response to the second wireless station being a mobile wireless station whose location is not specifiable, restricting use of the frequency band by the second wireless station.

The generating of the protected area contour may include: in response to an aimed orientation of an antenna of the first wireless station not being specifiable, generating the protected area contour based on a beam tilt angle of the antenna.

According to an embodiment, there is provided an apparatus configured to generate a protected area contour for frequency sharing, the apparatus including: a memory including instructions; and a processor electrically connected to the memory and configured to execute the instructions. When the instructions are executed by the processor, the processor may be configured to control a plurality of operations, and the plurality of operations may include: determining a fixed distance to exclude a second wireless station which is an interferer, based on morphological information of a location of a first wireless station which is a victim; and generating a contour of an area having the fixed distance as a radius with respect to the first wireless station.

Other features and aspects will be apparent from the following detailed description, the drawings, and the claims.

BRIEF DESCRIPTION OF THE DRAWINGS

FIGS. 6A and 6B are diagrams illustrating a method of deriving an analysis area using a linear scanning method according to an embodiment.

FIG. 11 is a diagram illustrating a method of generating a protected area contour in a polygonal analysis area according to an embodiment.

DETAILED DESCRIPTION

Figure 1:
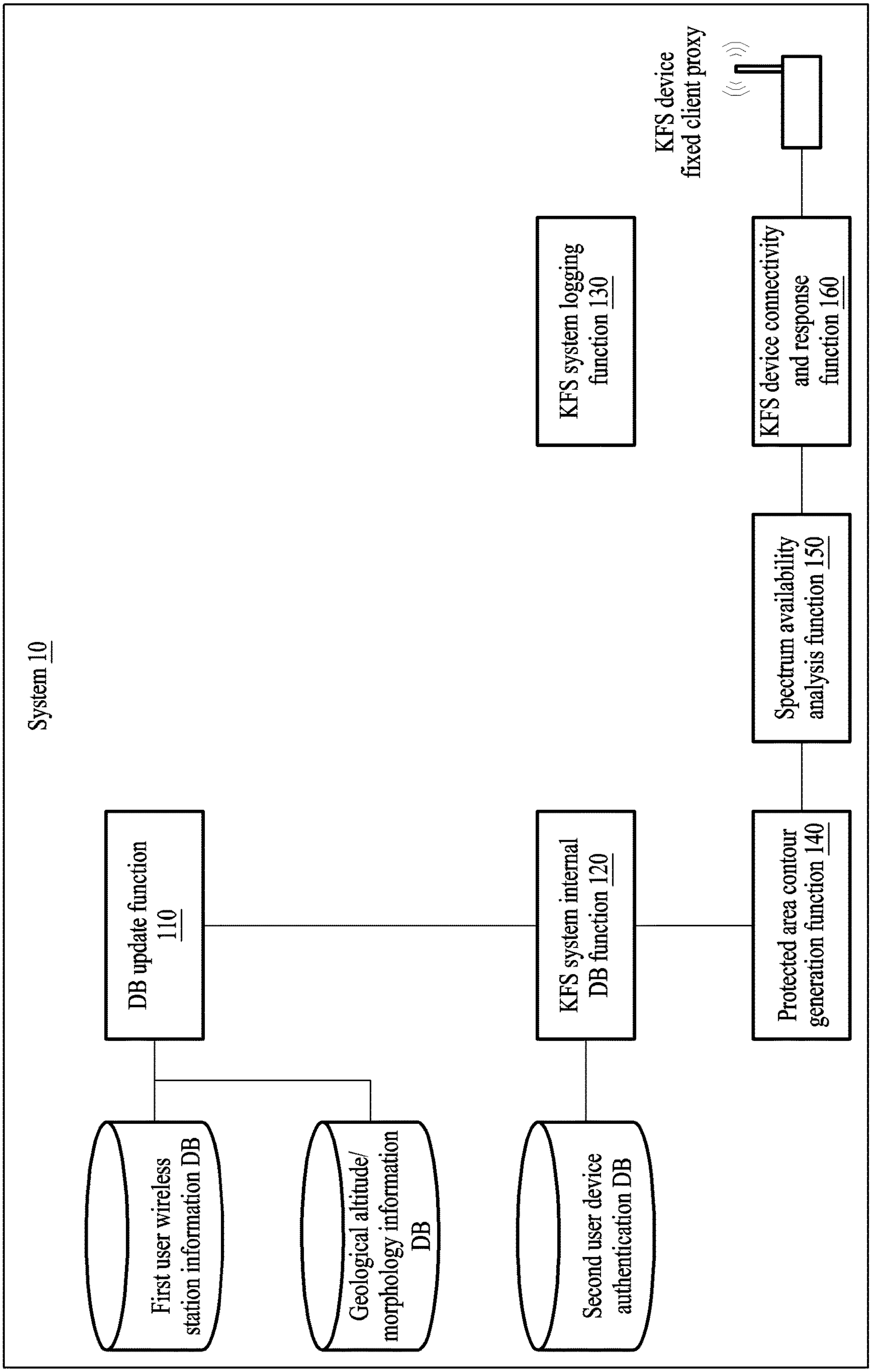
FIG. 1 is a diagram illustrating a structure of a Korean frequency sharing (KFS) system.

The following structural or functional descriptions of example embodiments are merely intended for the purpose of describing the example embodiments, and the example embodiments may be implemented in various forms. The example embodiments are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component, or intervening components may be present.

As used herein, "A or B," "at least one of A and B," "at least one of A or B," "A, B or C," "at least one of A, B and C," and "A, B, or C," each of which may include any one of the items listed together in the corresponding one of the phrases, or all possible combinations thereof. The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms used herein including technical or scientific terms have the same meanings as those generally understood consistent with and after an understanding of the present disclosure. Terms, such as those defined in commonly used dictionaries, should be construed to have meanings matching with contextual meanings in the relevant art and the present disclosure, and are not to be construed as an ideal or excessively formal meaning unless otherwise defined herein.

As used in connection with various example embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in the form of an application-specific integrated circuit (ASIC).

As used herein, the term "unit" (or "-er/or") refers to software or hardware components such as a field-programmable gate array (FPGA) or an ASIC, and the unit may perform some functions. However, the unit is not limited to software or hardware. The unit may be configured to be on an addressable storage medium or may be configured to operate one or more processors. For example, the unit may include components, such as, software components, object-oriented software components, class components, and task components, processes, functions, attributes, procedures, subroutines, segments of program code, drivers, firmware, microcode, circuits, data, databases (DBs), data structures, tables, arrays, and variables. The functionality provided within components and units may be combined into fewer components and units or further separated into additional components and units. Further, the components and units may be implemented to operate one or more central processing units (CPUs) in a device or security multimedia card. Furthermore, the unit (or -er/or) may include one or more processors.

Hereinafter, example embodiments will be described in detail with reference to the accompanying drawings. When describing the example embodiments with reference to the accompanying drawings, like reference numerals refer to like components and a repeated description related thereto is omitted.

FIG. 1 is a diagram illustrating a structure of a Korean frequency sharing (KFS) system.

Referring to FIG. 1, according to an embodiment, a system 10 may be a Korean frequency sharing (KFS) system. Frequency sharing may refer to enabling a wireless station (e.g., a first wireless station) that has been previously providing a service in a specific frequency band and a wireless station (e.g., a second wireless station) that desires to jointly use the frequency band to function simultaneously with minimal interference with each other. The system 10 may perform a guard zone (also herein a "protected area") contouring function through an apparatus (e.g., an apparatus 2100 in FIG. 21) configured to generate a protected area contour for frequency sharing. The first wireless station may also be referred to as a victim and may include wireless stations, wireless communication systems, and wireless devices that provide a service to be protected primarily (e.g., a primary service). The second wireless station may also be referred to as an interferer and may include wireless stations that are less authorized to use a frequency. The second wireless station may include a radio local area network (RLAN), a wireless station, a wireless communication system, and a wireless device, which may share a frequency with the first wireless station to provide a service (e.g., a secondary service), and may cause interference in the primary service (also herein a "first service"). For example, the second wireless station may include Wi-Fi, LTE license-assisted access (LTE-LAA), 5G new radio-unlicensed (5G NR-U), and the like, which may use an unlicensed frequency bandwidth.

The system 10 may include a database (DB) update function module 110, a KFS system internal DB function module 120, a KFS system logging function module 130, a protected area contour generation function module 140, a spectrum availability analysis function module 150, and a KFS device connectivity and response function module 160. The DB update function module 110 may download the latest copy of a regulation DB required to operate the system 10, and adjust it with respect to an existing regulation DB (e.g., adding data, deleting expired data, correcting changed data, etc.). The DB update function module 110 may retrieve information (e.g., device model, device type, etc.) about a KFS device approved by a national regulatory authority. The KFS system internal DB function module 120 may update and modify parameters related to a wireless station (e.g., a first wireless station) providing a primary service that is an existing service and to a wireless station (e.g., a second wireless station) providing a secondary service that is an unlicensed service. The KFS system internal DB function module 120 may generate and validate a link of a fixed wireless station (e.g., the first wireless station and second wireless station). The KFS system logging function module 130 may receive and store events related to functions of the KFS system (e.g., the system 10). For example, it may function to preserve records of compliance with regulation requirements. The KFS system logging function module 130 may generate reports on the management of the system 10. The protected area contour generation function module 140 may generate protected area contours. For example, the protected area contour generation function module 140 may add, delete, and update protected area contours. Here, a protected area, or a guard zone, may refer to an area that protects the first wireless station from the influence or effect of interference of the second wireless station on the first wireless station and allows the first wireless station to provide a service normally. The protected area contour generation function module 140 may manage and update related algorithms of a propagation model and may merge protected area contours for wireless stations on the same link. The spectrum availability analysis function module 150 may select a criterion of maximum allowable output power (e.g., power spectrum density (PSD)) based on location uncertainty. For example, the spectrum availability analysis function module 150 may identify a maximum allowable PSD in a frequency band of 1 megahertz (MHz). It may identify a maximum allowable equivalent isotropic radiated power (EIRP) for each channel. The KFS device connectivity and response function module 160 may wait for an inbound hypertext transfer protocol secure (HTTPS) (or an HTTP over a secure sockets layer (SSL) message and may exchange messages related to encoding and other security parameters. The KFS device connectivity and response function module 160 may authenticate each inbound request appropriate for the implementation of the system 10 and may perform data validation on messages including device (e.g., KFS device) identifiers. The KFS device connectivity and response function module 160 may configure and transmit a spectrum inquiry response message related to an adaptive frequency control (AFC) device requesting inbound. The functions of the modules 110 to 160 described above may be implemented by the apparatus 2100. The apparatus 2100 may collect or aggregate information about the first wireless station and the second wireless station. The apparatus 2100 may calculate an effect (e.g., an interference-to-noise ratio (INR)) of interference by the second wireless station. The apparatus 2100 may set an analysis area where interference by the second wireless station is predicted to occur, and may generate a contour of a protected area (or simply a "protected area contour") of the first wireless station.

In response to a frequency usage request from a device (e.g., a KFS device), the system 10 may authorize the KFS device to use a corresponding frequency and perform data validation. Based on location information (e.g., location information of the device) and the frequency usage request, the system 10 may respond to the KFS device with a maximum allowable output power level in consideration of location uncertainty through the spectrum availability analysis function module 150, and may log a corresponding event. In this case, a protected area contour required for the spectrum availability analysis function module 150 to perform a spectrum availability analysis may be a contour pre-calculated by the protected area contour generation function module 140 or a contour calculated based on real-time coordinate information. In a case where a change occurs in at least one of an information DB for a first user (e.g., the first wireless station) and a geological altitude and/or morphology DB, the DB update function module 110 may update the DB and may additionally update a protected area contour generation function performed by the protected area contour generation function module 140.

Figure 2:
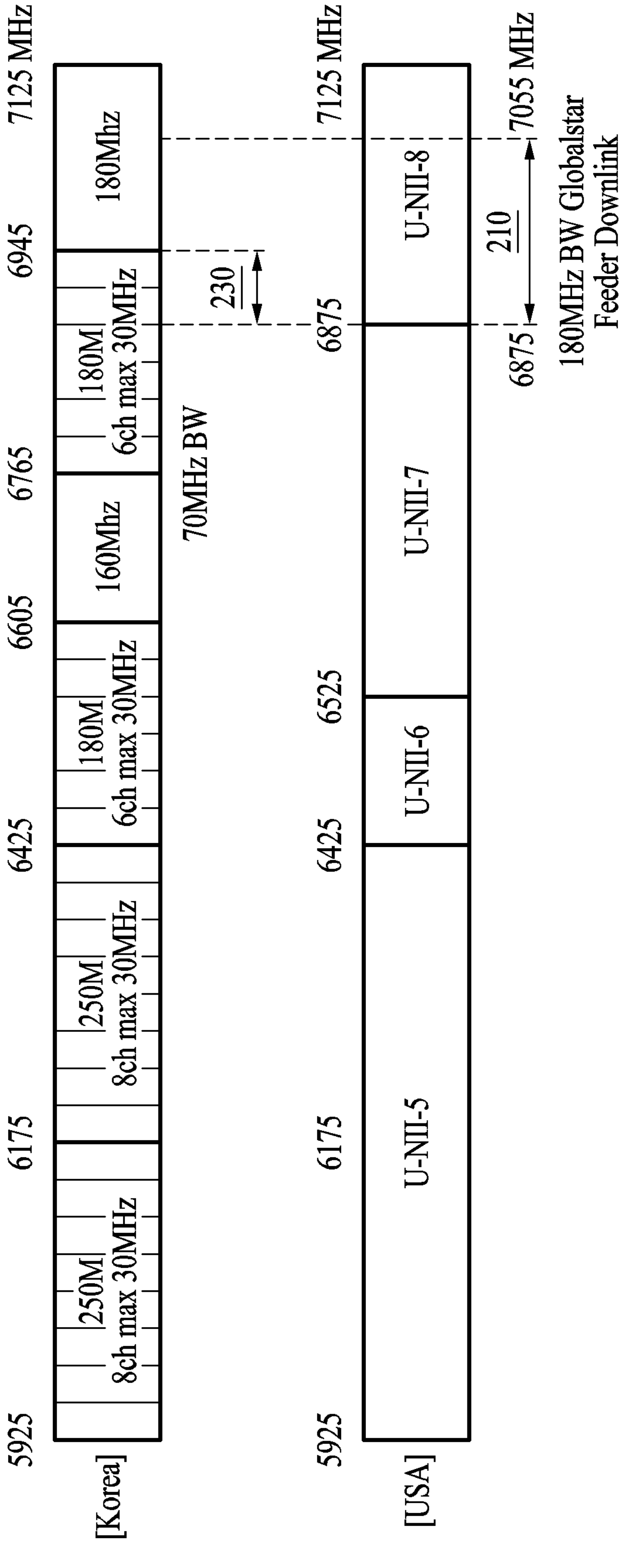
FIG. 2 is a diagram illustrating frequency allocation of a 6 gigahertz (GHz) band in Korea and the United States of America (USA).

FIG. 2 is a diagram illustrating frequency allocation of a 6 gigahertz (GHz) band in Korea and the United States of America (USA).

Referring to FIG. 2, according to an embodiment, illustrated is the current state of frequencies of a first service wireless station (e.g., a first wireless station) in a 6 GHz frequency band in Korea and the USA. A protection method to be applied for frequency sharing may vary according to a service (e.g., the importance of the service, etc.) provided by a first wireless station using a frequency band, and thus when the frequency band for frequency sharing is defined, it may be necessary to collect and aggregate information about the first wireless station using the defined band. For example, a frequency band from 5925 MHz to 7125 MHz may be used for fixed communication, the provision of a fixed broadcast relay service, uplink and downlink of a low earth orbit satellite, and the provision of a mobile broadcast relay service, and the service protection method for frequency sharing may vary depending on the importance and circumstances of each service. In a case where frequency sharing is involved in providing the fixed telecommunication and/or the fixed broadcast relay service where the location of transmitting and receiving wireless stations is fixed, a protected area (e.g., an area protected against interference) may be set by calculations based on actual topography (e.g., topography of a location where a wireless station is located). For a mobile broadcast relay service where the location of at least one of a transmitting wireless station or a receiving wireless station is variable, the location of the wireless station (e.g., a mobile wireless station) may not be specified, and setting a protected area may not be easy. Thus, in this case, another method may be used. For example, in a case where another wireless station or system is prohibited from using a frequency band used by the mobile broadcast relay service, or there is information (e.g., a service area, service hours, etc.) about a service schedule of the mobile broadcast relay service, temporal sharing of the frequency band may be available. In the case of an uplink to transmit data from a wireless station located on Earth (e.g., an earth station) to a low-orbit satellite, in order to reduce the influence of interference received by the low-orbit satellite, a technique for suppressing a radio emission in a direction receiving the interference may be applied when installing a secondary service (e.g., an RLAN) for which a frequency band is to be shared with the low-orbit satellite to protect the low-orbit satellite. In the case of a downlink to transmit data from the low-orbit satellite to the earth station, using a frequency band (e.g., a low-orbit satellite downlink frequency band) within an area having, as a radius, a distance calculated based on a radio wave received by the earth station in consideration of a radio loss (or propagation loss) may be prohibited, and the band may be protected from interference. In the case of the downlink of the low-orbit satellite, setting a protected area by calculating an amount of interference based on an actual topography of a location where the earth station is located. FIG.

2 illustrates an example reallocation of a fixed broadcast relay service and a mobile broadcast relay service to the 6 GHz frequency band in Korea. For example, FIG. 2 illustrates an example in which frequencies used to provide the fixed broadcast relay service and the mobile broadcast relay service scattered throughout the 6 GHz band are reallocated to a 6425 MHz to 7125 MHz band, and frequency bands for providing the mobile broadcast relay service are integrated into two bands (e.g., 160 MHz and 180 MHz) to resemble unlicensed national information infrastructure (U-NII) bands (e.g., U-NII-6 and U-NII-8 bands), which are unlicensed wireless communication frequency bands in the USA. Referring to FIG. 2, according to an embodiment, a 180 MHz band (e.g., a band 210) from 6875 MHz to 7055 MHz may be a frequency band used for a feeder downlink for a data communication service provided by a globalstar which is a satellite communication company, and frequency sharing may occur in a 70 MHz band (e.g., a band 230) from 6875 MHz to 6945 MHz, which may require the calculation of a protected area. Since the band 230 is used as a downlink for communication between a non-geostationary satellite and a fixed earth station, an antenna beam tilt angle of the fixed earth station may be an important factor in generating a protected area. The generation of a protected area based on an antenna beam tilt angle will be described in more detail below with reference to FIGS. 19A and 19B.

Figure 3:
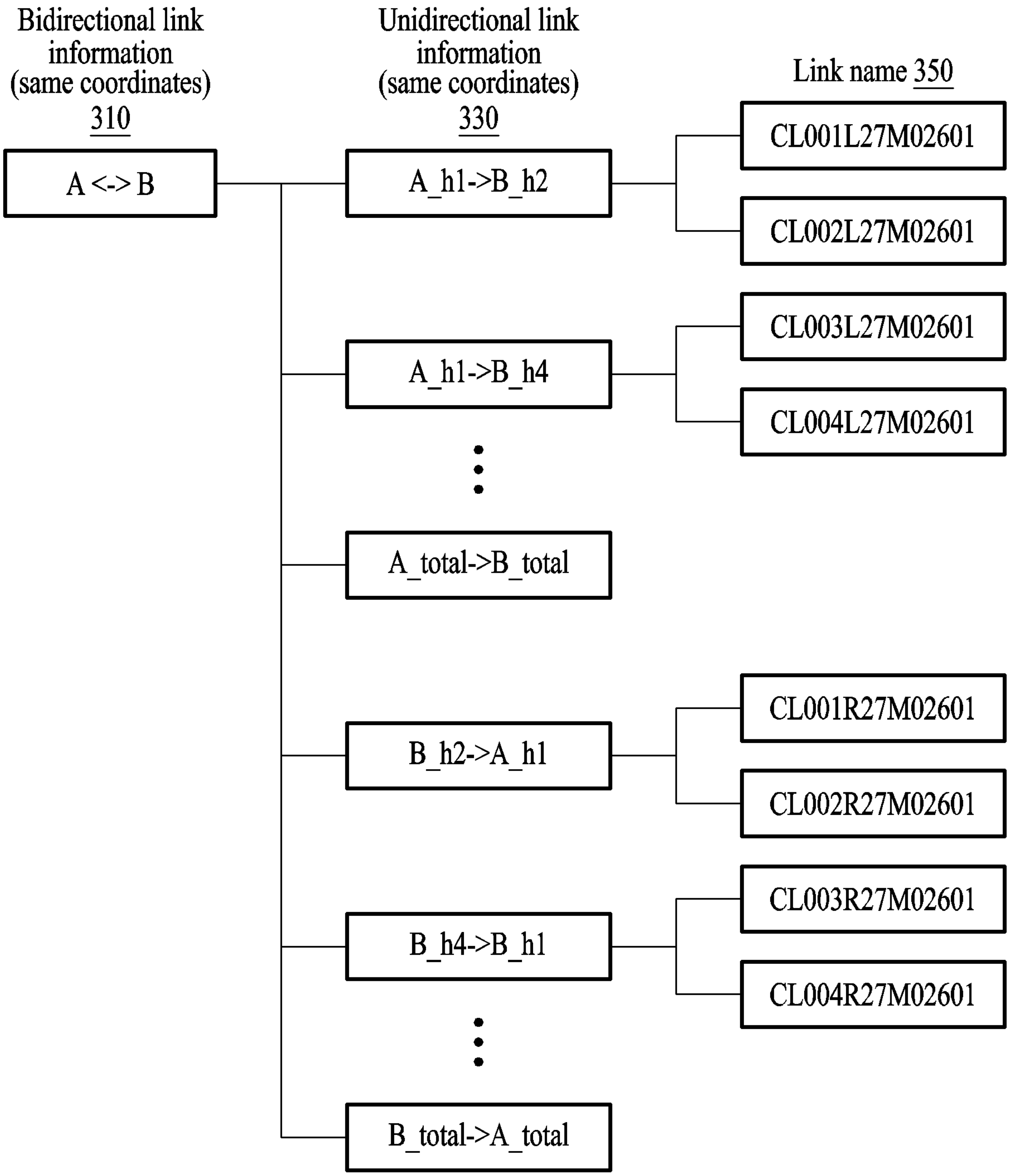
FIG. 3 is a diagram illustrating a classification structure of wireless stations for path profile acquisition and protected area simulation according to an embodiment.

FIG. 3 is a diagram illustrating a classification structure of wireless stations for path profile acquisition and protected area simulation according to an embodiment.

Referring to FIG. 3, according to an embodiment, illustrated are an example in which an apparatus (e.g., the apparatus 2100 in FIG. 21) classifies a first wireless station and a second wireless station, which share frequencies before generating a protected area contour, and example links (e.g., bidirectional link information 310 and unidirectional link information 330). For ease of description, it is assumed that the first wireless station (e.g., a fixed wireless station), which is a victim, and the second wireless station (e.g., an RLAN), which is an interferer, operate at the same frequency and use frequencies in the same bandwidth. The fixed wireless station located at the same coordinates may have the same path profile for transmission and reception, and the INR may be derived from the same antenna ground elevation. The apparatus 2100 may obtain a path profile through classification by forward and backward directions based on coordinates of all wireless station links, and may perform simulation on the wireless station links with different antenna ground elevations based on the path profile. The bidirectional link information 310 may represent a bidirectional link through which two wireless stations (e.g., a wireless station A and a wireless station B) transmit and receive data in both directions. The unidirectional link information 330 may represent a unidirectional link through which one wireless station (e.g., the wireless station A or the wireless station B) transmits data to the other wireless station.

For example, A_h1→B_h1 may represent a unidirectional link through which a signal transmitted by a wireless station A with an antenna ground elevation of h1 (height 1) is received by a wireless station B with an antenna ground elevation of h2. For example, A_h3→B_h4 may be classified because, when the wireless station A and/or the wireless station B have other ground elevations different from h1 and/or h2, there may be a change in an aimed antenna orientation angle and gain and different protected area contours may be generated. Since protected area contours generated in the case of different antenna ground elevations for the same wireless station link may represent similar protected areas, reducing the number of contours may be efficient in reducing the complexity. For example, a protected area contour to be formed based on an A_total→B_total link may be formed as a union of multiple protected area contours formed from unidirectional links formed with the wireless station A and the wireless station B, and may be the widest contour.

The apparatus 2100 may generate a simulation group, which is a basic unit for simulation for generating a protected area contour. A link connecting transmission and reception may be used to determine the basic unit (e.g., a simulation group) for the simulation for generating a protected area contour. For example, based on individual links connecting transmission and reception, a bidirectional link with the same wireless station location may be generated, and links with different center frequencies (CFs) among the same unidirectional links may be used to generate a simulation group for performing the simulation. To analyze interference to generate a protected area contour, defining transmission and reception parameters for a primary service and a secondary service may be required. Table 1 shows transmission and reception parameters for the primary service (e.g., a service provided by the first wireless station).

TABLE 1

| Items | Values | Availability | Items | Values | Availability |
|---|---|---|---|---|---|
| Facility name | CCC | M (mandatory) | Transmitting antenna maximum gain [dBi] | 41 | Unused, M (mandatory) in CINR |
| Center frequency (CF) [GHz] | 6 | M (mandatory) | Transmitting antenna pattern | F.699 | Unused, O (optional) in CINR |
| Authorized bandwidth [MHz] | 30 | M (mandatory) | Transmitting antenna beam width [°] | 1.5 | Unused, O (optional) in CINR |
| Occupied bandwidth [MHz] | 30 | O (optional) | Transmitting feeder loss [dB] | 1.35 | Unused, O (optional) in CINR |
| Transmitting station name | AAA | M (mandatory) | Receiving antenna maximum gain [dBi] | 41 | M (mandatory) |
| Transmitting antenna longitude [°] | 127.1234 | M (mandatory) | Receiving antenna pattern | F.699 | O (optional) |
| Transmitting antenna latitude [°] | 36.1234 | M (mandatory) | Receiving antenna beam width [°] | 1.5 | O (optional) |
| Transmitting antenna ground elevation [m] | 24 | M (mandatory) | Receiving feeder loss [dB] | 2.85 | O (optional) |
| Receiving station name | BBB | M (mandatory) | Polarization type | V | O (optional) |

TABLE 1-continued

| Items | Values | Availability | Items | Values | Availability |
|---|---|---|---|---|---|
| Receiving antenna longitude [°] | 126.1234 | M (mandatory) | System temperature [K] | 230 | O (optional) |
| Receiving antenna latitude [°] | 35.1234 | M (mandatory) | Noise figure [dB] | 2.5 | O (optional) |
| Receiving antenna ground elevation [m] | 24 | M (mandatory) | Reference INR value [dB] | −10 | M (mandatory), unused in CINR |
| Transmission power [dBW] | 2.04 | Unused, M (mandatory) in CINR | Reference CINR value [dB] | 20 | Unused, M (mandatory) in CINR |

A wireless station receiving an allocated frequency may store transmission and reception parameters in a radio wave management DB, based on data submitted when applying for the frequency. When selecting a first wireless station, it may be necessary to select parameters (e.g., transmission and reception parameters in Table 1) required for an analysis of interference of the information of wireless stations receiving allocated frequencies in a corresponding frequency band. The transmission and reception parameters in Table 1 may include mandatory items that are required without error and optional items that are not mandatory but may contribute to a difference in the accuracy of results if not used. In a case where the apparatus 2100 sets an analysis area and calculates a protected area based on an INR, parameters other than a transmission location of the first wireless station may not be mandatory in the calculation process. In a case where the apparatus 2100 calculates a protected area based on an INR (e.g., a carrier to interference-plus-noise ratio (CINR)) that is calculated based on a desired received signal level of the first wireless station, a transmission power, a transmitting antenna gain, and a reference CINR value may be mandatory items.

Optional items that are not required to be used by the apparatus 2100 to calculate interference may be considered further in cases where no specific value is set, or where there is an error in a result (e.g., an interference analysis result). A value for each item shown in Table 1 may be a default value and may vary depending on the settings of an administrator of a device (e.g., the apparatus 2100). In general, four leading digits in the form of radio waves may correspond to an authorized bandwidth, and an occupied bandwidth may be determined based on the authorized bandwidth. Based on the occupied bandwidth, a receiving mask attribute of a primary service may be determined. The occupied bandwidth may be adjusted for mapping to the predetermined receiving mask. For an item "receiving antenna pattern" (or receive antenna pattern), when there is a pattern in a wireless station DB, the apparatus 2100 may apply the pattern to the calculation of a protected area. When there is no pattern in the wireless station DB, the apparatus 2100 may apply a Rec. IRU-R F.699-applied recommended pattern to the calculation of a protected area based on an antenna gain and an antenna beam width. For a receiving antenna beam width, when there is a specific value in the wireless station DB, the apparatus 2100 may apply the value as is. For other optional items, the apparatus 2100 may calculate values based on frequency, antenna gain, and equations in Rec. ITU-R F.699. For a receiving feeder loss, when there is an attenuation value (e.g., a feeder line attenuation value) in the wireless station DB, the apparatus 2100 may apply the value as is. When there is no attenuation value in the wireless station DB, the apparatus 2100 may apply a receiving feeder loss value to the generation of a protected area based on a state of connectivity between an antenna and a transmitting and receiving device. For example, the apparatus 2100 may apply a receiving feeder loss value of 0 dB to set a protected area when the antenna and the transmitting and receiving device are directly connected, apply a receiving feeder loss value of 3 dB when the transmitting and receiving device is an indoor unit (IDU), or apply a receiving feeder loss value of 0 dB when information about the connection between the antenna and the transmitting and receiving device is unknown. For a polarization type, when there is data on a polarization type in the wireless station DB, the apparatus 2100 may apply the polarization type, or may apply V (vertical) in the absence of the data. In addition, for a system temperature and a noise figure, values present in the wireless station DB may be used as is. When the values for the system temperature and the noise figure are not present in the wireless station DB, 4 dB in a lower 6 GHz band and 4.5 dB in an upper 6 GHz band may be applied.

A second wireless station (e.g., an RLAN), which is an interferer, may be applied to specified parameters (e.g., the transmission and reception parameters) in the same way throughout the entire analysis process (e.g., a process of generating a protected area contour). Table 2 shows transmission and reception parameters for the secondary service (e.g., a service provided by the second wireless station).

TABLE 2

| Items | Values | Availability |
|---|---|---|
| Center frequency (CF) [GHz] | 6 | Unused, applied to FDR |
| Occupied bandwidth [MHz] | 20 | Unused, applied to FDR |
| Transmitting mask | IEEE 802.11ax | Unused, applied to FDR |
| Transmission power [dBm] | 27/30 | M (mandatory), applied to EIRP |
| Antenna maximum gain [dBi] | 0 | Default 0 dBi, applied when using pattern |
| Antenna height [m] | 10/40 | M (mandatory), |
| Antenna pattern | Omnidirectional | Default, omnidirectional, applied when using pattern |
| Antenna beam width [°] | — | Default, omnidirectional, applied when using pattern |
| Feeder loss [dB] | 0 | Unused |
| Polarization type | V | Unused |

The transmission parameters of the RLAN that are required for the apparatus 2100 to calculate an INR (e.g., an RINR) may include a transmission power, an antenna height, and an indoor/outdoor classification. By default, the transmission power of the RLAN may be set based on equivalent isotropic radiated power (EIRP), and the antenna gain and pattern may be considered a gainless antenna radiating in all directions. When using the antenna pattern, the antenna pattern may be used additionally to generate a protected area, in addition to the antenna gain and beam width. For ease of description, two cases in which the maximum EIRP is 30 dBm and the minimum EIRP is 27 dBm are assumed, but embodiments are not limited thereto. A center frequency, an occupied bandwidth, and a transmitting mask may be applied to calculate frequency dependent rejection (FDR) after calculating an RINR is completed. In addition, presetting a height at which the RLAN is located may be required. This is because a radio wave environment may be viewed differently depending on a look height (e.g., a ground elevation) at the same coordinates when the apparatus 2100 calculates the RINR, and thus an interference effect may be different. In general, the higher the height of an interferer (e.g. the RLAN), the greater the amount of interference, and thus a greater protected area may be required. For ease of description, only two values—a maximum ground elevation of 40 meters (m) and a minimum ground elevation of 10 m—are assumed, but values of ground elevation are not limited thereto, and may be implemented in various ways through more detailed classification. For an item "antenna height" (e.g., an antenna ground elevation), the apparatus 2100 may select the lowest representative ground elevation that is higher than a ground elevation received from the RLAN which is the second wireless station. For example, in a case where the ground elevation received from the RLAN exceeds a maximum ground elevation (e.g., 40 m), the apparatus 2100 may calculate the antenna height as the maximum ground elevation. For example, the apparatus 2100 may select a ground elevation value of 10 m when the ground elevation of the RLAN is 3 m, and may select a ground elevation of 40 m, which is the maximum ground elevation, when the ground elevation of the RLAN is 55 m which exceeds the maximum ground elevation, to generate a protected area contour.

Figure 4:
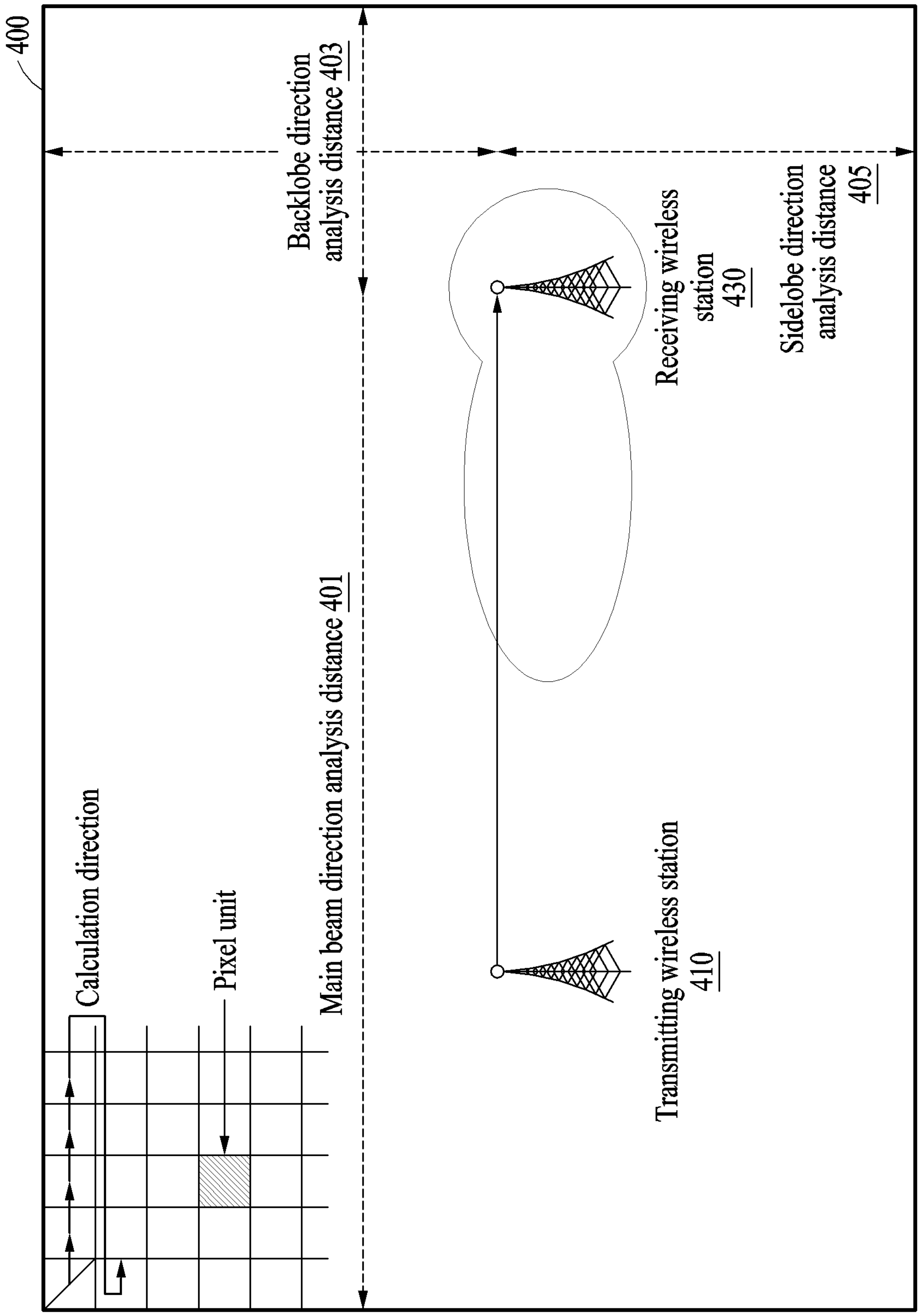
FIG. 4 is a diagram illustrating setting an initial analysis distance in a linear scanning method according to an embodiment.

FIG. 4 is a diagram illustrating setting an initial analysis distance in a linear scanning method according to an embodiment.

Referring to FIG. 4, illustrated is a linear scanning method provided as an example of a method in which an apparatus (e.g., the apparatus 2100 of FIG. 21) performing a method of generating a protected area contour for frequency sharing calculates an INR for generating a protected area contour.

For the apparatus 2100 to generate a protected area contour for a first wireless station (e.g., a receiving wireless station 430), it may be necessary to set an area (e.g., an analysis area) where interference by a second wireless station (e.g., a transmitting wireless station 410) is predicted to occur. Since, without setting the analysis area, a great amount of time may be used to calculate a protected area for a link of a single wireless station (e.g., the receiving wireless station 430), setting the analysis area appropriately may be required. For example, in a case where the analysis area is set to be extremely small, an analysis may not be properly performed on a point where interference is likely to occur, failing to protect the receiving wireless station 430. In contrast, in a case where the analysis area is set to be extremely large, the analysis may be performed even on a point where interference is not likely to occur, excessively increasing the required amount of time and the size of data.

The linear scanning method may calculate an effect (e.g., INR) of interference sequentially from top to bottom, from left to right, along latitude and longitude. For example, the apparatus 2100 may set a start point and an end point for the calculation in a rectangular area set based on the latitude and longitude, and sequentially calculate the effect of the interference. The apparatus 2100 may set an initial analysis area (e.g., an initial analysis area 400) to set a final analysis area. A main beam direction analysis distance (e.g., a main beam direction analysis distance 401) may refer to a distance in a main beam direction corresponding to a direction of an antenna of the transmitting wireless station 410 from a location of an antenna of the receiving wireless station 430. When the height (e.g., an antenna ground elevation) of the receiving wireless station 430 increases, a probability that a protected area contour is generated up to a location where the main beam direction analysis distance 401 is large may increase. The main beam direction analysis distance 401 may be n kilometers (km) (where "n" may be 100) and may vary depending on the settings. A sidelobe direction analysis distance (e.g., a sidelobe direction analysis distance 405) may refer to a distance in a direction perpendicular to a main beam of the antenna of the receiving wireless station 430. The sidelobe direction analysis distance 405 may depend on sidelobe characteristics of the antenna, and may be m km (wherein "m" may be 20). A backlobe direction analysis distance (e.g., a backlobe direction analysis distance 403) may refer to a distance in an opposite direction from the main beam. The backlobe direction analysis distance 403 may depend on backlobe characteristics of the antenna, and may be x km (where "x" may be 10). The initial analysis area 400 may vary depending on transmission and reception characteristics of a link of a wireless station (e.g., the receiving wireless station 430 and the transmitting wireless station 410) and topographical features.

Figure 5:
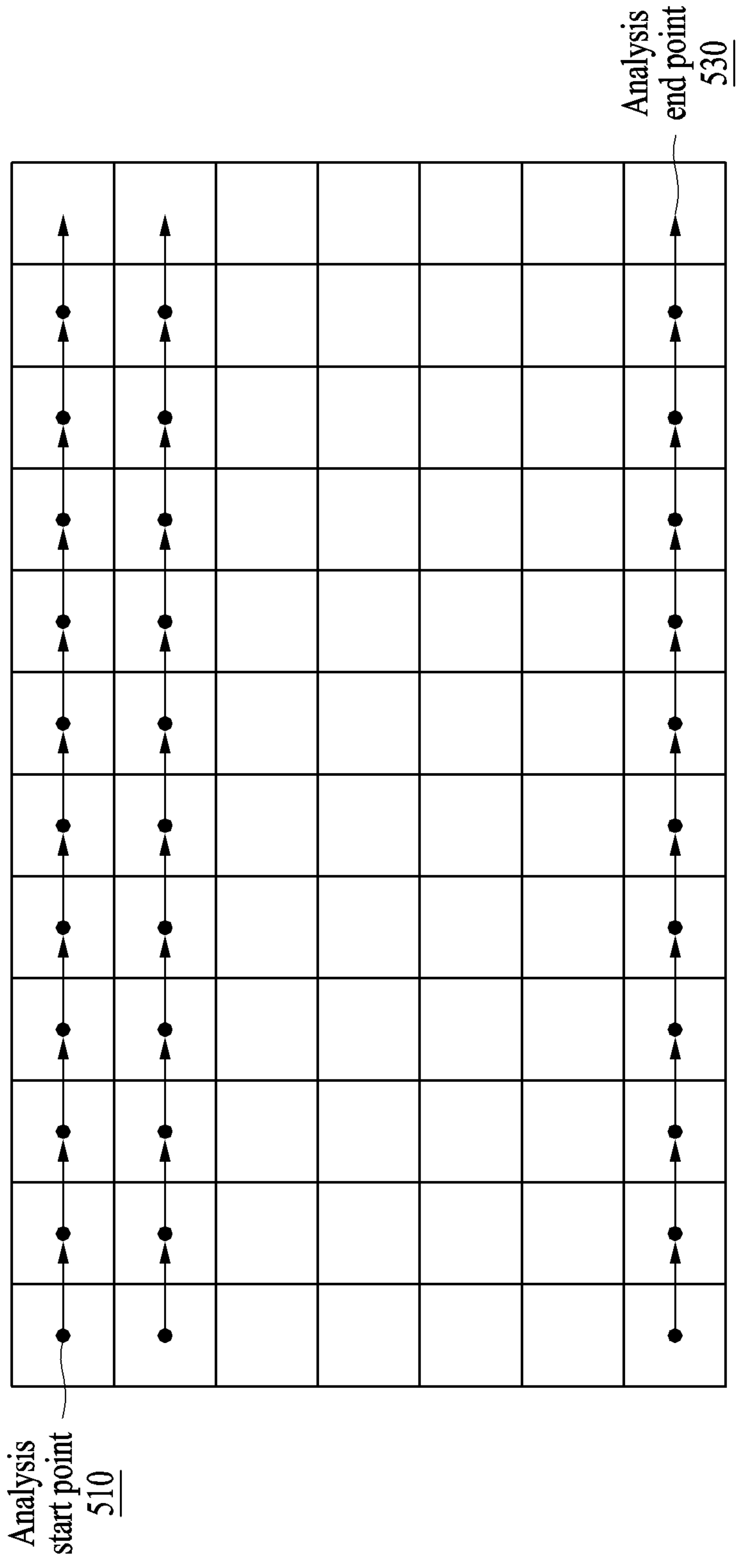
FIG. 5 is a diagram illustrating a linear scanning method according to an embodiment.

FIG. 5 is a diagram illustrating a linear scanning method according to an embodiment.

Referring to FIG. 5, according to an embodiment, illustrated is the linear scanning method described above with reference to FIG. 4.

Once an initial analysis area (e.g., the initial analysis area 400 in FIG. 4) is set, the apparatus 2100 may scan it from left to right by an analysis distance resolution from an analysis start point 510 to set a final analysis area, and may calculate an INR (e.g., an RINR). When an end of a corresponding line is reached, the apparatus 2100 may move to a next line to scan it from left to right, and may calculate an RINR value. The apparatus 2100 may end calculating the RINR when an analysis end point 530 is reached. The apparatus 2100 may calculate the RINR value used to generate an analysis area and a protected area contour using Equation 1 below. The RINR, which is an effect of interference, may be calculated under the assumption that a first wireless station (or a victim) receives the total transmission power of a second wireless station (or an interferer) (e.g., an RLAN), without considering an FDR value. The FDR value, which may be generated by a center frequency difference and a bandwidth difference may be calculated in a process of calculating a final available frequency and a maximum allowable power.

$$RINR = RI - N = (\text{P\_RLAN} - PL + \text{G\_FS} - FL) - (NF + NL) \quad \text{[Equation 1]}$$

In Equation 1, RI denotes a total amount of interference by an interferer under the assumption that EIRP of an RLAN has a CW-type signal; N denotes a total received noise level based on a noise figure and a bandwidth of a receiver of a first wireless station; P_RLAN denotes an EIRP output power under the assumption that an antenna gain of the RLAN is 0 dBi; PL denotes a total propagation loss based on a propagation path loss, a clutter loss, and a building transmission loss; G_FS denotes a receiving antenna gain in a direction of the interferer; FL denotes a receiving feeder loss; NF denotes a receiving noise figure of a fixed wireless station (e.g., the first wireless station); and NL denotes a received noise level based on a receiving bandwidth.

FIGS. 6A and 6B are diagrams illustrating a method of deriving an analysis area using a linear scanning method according to an embodiment.

FIG. 6A illustrates a method of deriving a rectangular analysis area using a linear scanning method according to an embodiment.

Referring to FIG. 6A, according to an embodiment, an apparatus (e.g., the apparatus 2100 in FIG. 21) may obtain an INR (e.g., an RINR) by scanning an initial analysis area using the linear scanning method described above with reference to FIGS. 4 and 5, and store the obtained result value in the form of a matrix with latitude and longitude as indices. Based on the stored RINR value, the apparatus 2100 may set an analysis area where interference is predicted to occur. The analysis area may include, for example, a rectangular analysis area and a polygonal analysis area. The apparatus 2100 may detect a first area (e.g., an area 620) having an RINR value that exceeds a predetermined value (e.g., −20 dB). The apparatus 2100 may set the analysis area (e.g., a final analysis area), based on the location (e.g., latitude and longitude) of the first area. For example, to derive the final analysis area, the apparatus 2100 may find a point (e.g., a point 610) at which a value exceeding the predetermined value (e.g., −20 dB) first appears from the outermost portion of the matrix (e.g., the matrix in FIG. 6A). The apparatus 2100 may then set the final analysis area (e.g., an analysis area 650) by extracting coordinates of a point having a latitude and longitude that is one degree above the point (e.g., the point 610). For example, an RINR value at the point 610 with a latitude of 36.7 and a longitude of 127.7 is −11, which exceeds the predetermined value (e.g., −20 dB), and thus the highest latitude may be determined to be 36.8 degrees. In the same manner, the apparatus 2100 may set the final analysis area (e.g., the analysis area 650) by determining a point (e.g., a point 640) with the lowest latitude, a point (e.g., a point 630) with the lowest longitude, and a point with the highest longitude, in the area 620.

FIG. 6B illustrates a method of deriving a polygonal analysis area using a linear scanning method according to an embodiment.

Referring to FIG. 6B, according to an embodiment, the apparatus 2100 may set a polygonal analysis area (e.g., an analysis area 670). The apparatus 2100 may set the polygonal analysis area by generating a polygon consisting of an outline connecting coordinates of points having latitudes and longitudes one level above the outermost point, with respect to an area (e.g., an area 660) where an INR (e.g., an RINR) exceeds a predetermined value. For example, the area 660 may be an area in which an RINR value exceeds a predetermined reference value (e.g., −20 dB), and a polygonal analysis area 670 may be set with a polygon consisting of an outline of the outermost point of the area 660. The analysis area 670 may be set as two or more polygons that are spaced apart. For example, the apparatus 2100 may set polygonal analysis areas spaced from each other by setting one analysis area (e.g., a first analysis area) and then detecting the presence of an area exceeding another reference value (e.g., a reference RINR value) in an area excluding the first analysis area. In general, as a reference value (e.g., an INR value) upon which an analysis area (e.g., the analysis area 650 and the analysis area 670) is based is set to a lower level (e.g., −20 dB) than a reference value (e.g., −10 dB) upon which a protected area is based, the analysis area (e.g., the analysis area 650 and the analysis area 670) may be set to be larger than the final protected area. The apparatus 2100 may determine the analysis area (e.g., the analysis area 650 and the analysis area 670) to be the final protected area without further RINR calculation by setting the reference value (e.g., the INR value) for setting the analysis area (e.g., the analysis area 650 and the analysis area 670) to the reference value for the protected area.

Figure 7:
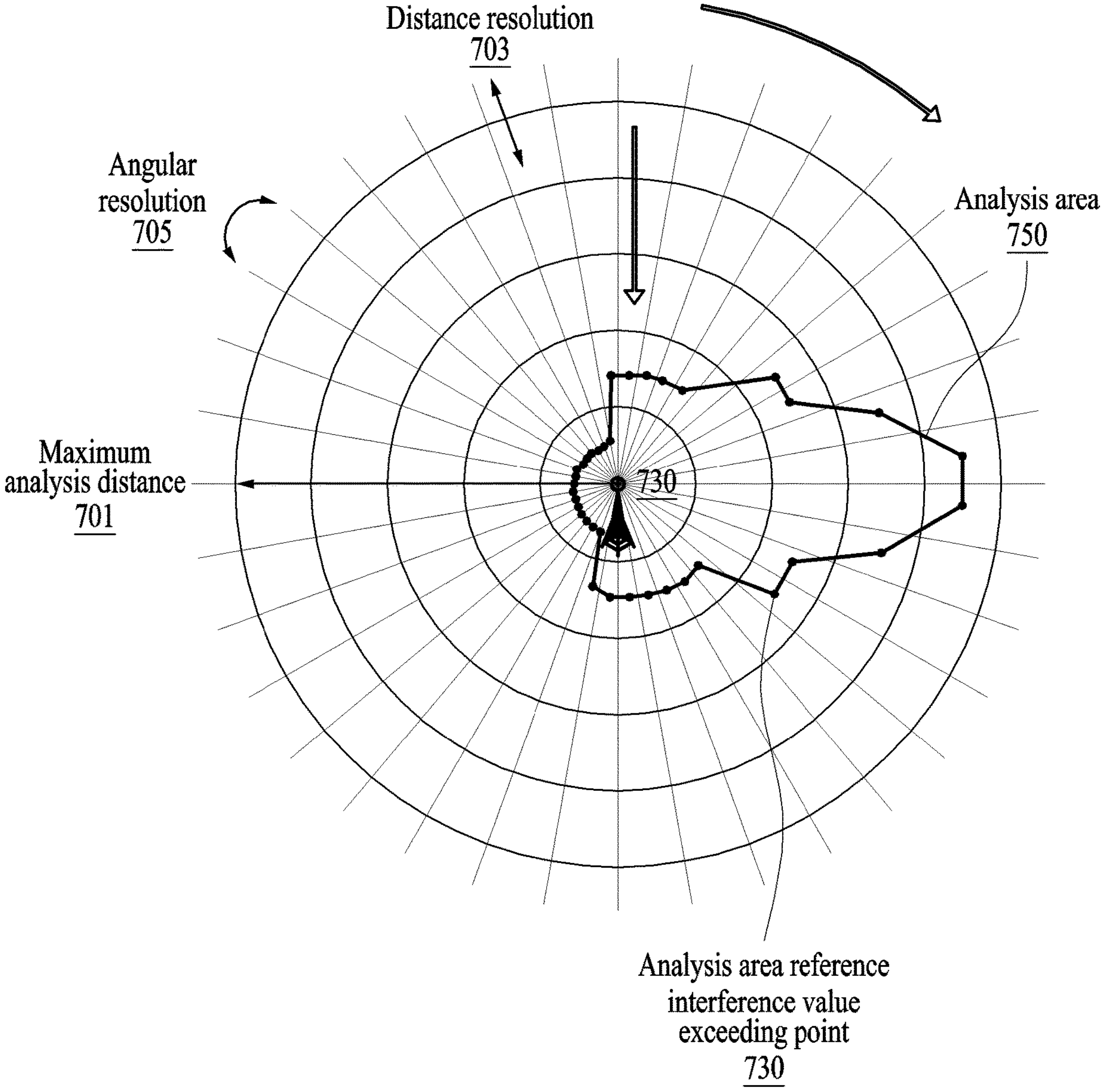
FIG. 7 is a diagram illustrating a circular scanning method according to an embodiment.

FIG. 7 is a diagram illustrating a circular scanning method according to an embodiment.

Referring to FIG. 7, according to an embodiment, an apparatus (e.g., the apparatus 2100 in FIG. 21) may select a circular scanning method to set an analysis area and generate a protected area contour. The linear scanning method described above with reference to FIGS. 6A and 6B is the simplest and most intuitive scanning method but may require calculations of INRs at all points based on a resolution (e.g., a distance resolution), consuming a great amount of time and unnecessarily calculating a portion that does not require a calculation.

The circular scanning method may scan radially a surrounding area based on the location of a first wireless station (e.g., a wireless station 730 and the receiving wireless station 430 in FIG. 4). For example, the apparatus 2100 may set a circle having the location of the wireless station 730 as a center and a maximum analysis distance (e.g., a maximum analysis distance 701) as a radius. The apparatus 2100 may calculate an RINR value by scanning the surrounding area from a location that is separated from the wireless station 730 by the maximum analysis distance 701 while moving toward the center (e.g., the location of the wireless station 730) by a distance resolution (e.g., a distance resolution 703). The maximum analysis distance 701 may be set to be the same as a main beam direction analysis distance (e.g., the main beam direction analysis distance 401) in the linear scanning method, because a protected area in a main beam direction of a receiving station is the farthest. For ease of description, for example, under the assumption that the maximum analysis distance 701, which is the maximum radius of the circular area, is 100 km; the distance resolution 703 is 30 m; a reference INR value for setting an analysis area is −20 dB; and an angular resolution 705 is 1 degree, a start point of an analysis in the circular scanning method may be a point separated northward from the wireless station 730 by the maximum analysis distance 701. The apparatus 2100 may calculate an INR (e.g., an RINR) by performing scanning first in a distance direction for a specific angle, and then move in an angle direction to calculate the INR. For example, the apparatus 2100 may calculate an RINR value at a point separated by the maximum analysis distance 701 (e.g., 100 km) at an angle of 0 degrees relative to the north of the wireless station 730. In this case, when a result of the calculation is not greater than −20 dB, the apparatus 2100 may calculate the RINR by moving to the center (e.g., the location of the wireless station 730) by the distance resolution 703 (e.g., 30 m). When the apparatus 2100 completes calculating the RINR value by moving in the distance direction from the angle of 0 degrees, it may move clockwise by the angular resolution 705 (e.g., 1 degree), and then repeat such a calculation process by moving by the distance resolution 703 (e.g., 30 meters). Lastly, the apparatus 2100 may calculate the RINR value for 360 angles by storing coordinates of a point at the angle of 359 degrees where the RINR value is greater than −20 dB, and may set an analysis area (e.g., an analysis area 750) having the coordinates (e.g., an analysis area reference interference value exceeding point 730).

The circular scanning method may have a reduced number of calculations of a path profile compared to the linear scanning method, and may thus have a reduced overall analysis time. Due to the nature of a circular analysis, the circular scanning method may have a lower analysis resolution as a distance between analysis points increases at a location farther from the center. For example, for two points separated by the same distance from the wireless station 730, but separated by an angular resolution of 1 degree, a distance between the two points may be 17 m if the distance from the wireless station 730 is 1 km, 87 m if 5 km, 870 m if 50 km, and 1740 m if 100 km. Thus, as the distance from the wireless station 730 increases, an RINR may be calculated at wider intervals, and thus the analysis resolution may be reduced. When the analysis resolution decreases, morphological information about remaining points between the calculation points may be ignored, which may reduce the analysis accuracy. When the circular scanning method is selected to set an analysis area, the apparatus 2100 may set the angular resolution 705 to 1 degree or less for the analysis accuracy. The apparatus 2100 may set a reference INR value for setting the analysis area to be on the order of −20 dB, which is 10 dB less than a reference value for setting an actual protected area, for the analysis accuracy. In general, as the reference value (e.g., an INR value) for setting the analysis area (e.g., the analysis area 750) is set to be at a lower level (e.g., −20 dB) than the reference value (e.g., −10 dB) for setting the protected area, the analysis area (e.g., the analysis area 750) may be set to be larger than the final protected area. The apparatus 2100 may set the reference INR value for setting the analysis area to the reference value (e.g., −10 dB) for the protected area, and may determine the analysis area 750 as the final protected area without further RINR calculations.

Figure 8:
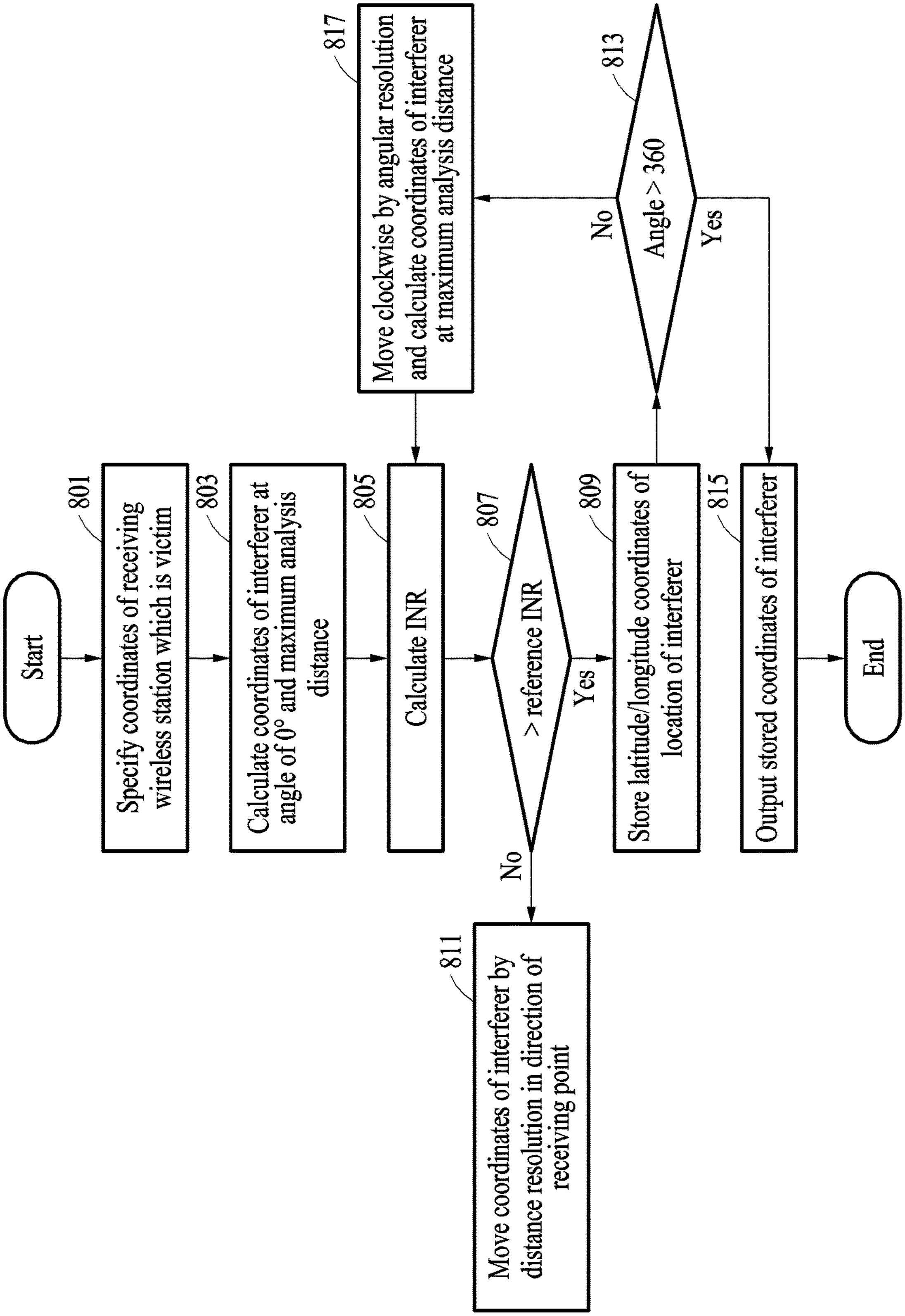
FIG. 8 is a flowchart illustrating a method of deriving an analysis area using a circular scanning method according to an embodiment.

FIG. 8 is a flowchart illustrating a method of deriving an analysis area using a circular scanning method according to an embodiment.

Referring to FIG. 8, according to an embodiment, operations described below with reference to FIG. 8 may be included in the circular scanning method performed by an apparatus (e.g., the apparatus 2100) described above with reference to FIG. 7.

In operation 801, the apparatus 2100 may specify coordinates of a receiving wireless station (e.g., the wireless station 730 in FIG. 7) that is a victim. For example, the apparatus 2100 may specify, as the coordinates, a location by setting a latitude and a longitude of the wireless station 730.

In operation 803, the apparatus 2100 may calculate coordinates of an interferer (e.g., a second wireless station) at a point that is separated from the wireless station 730 by an angle of zero (0) degrees and a maximum analysis distance (e.g., the maximum analysis distance 701) relative to the wireless station 730.

In operation 805, the apparatus 2100 may calculate an INR (e.g., an RINR), which is an effect of interference, based on the calculated coordinates of the interferer.

In operation 807, the apparatus 2100 may determine whether a calculated RINR value exceeds a reference value. In response to the RINR value at a corresponding point exceeding the reference value, the apparatus 2100 may perform operation 809. In response to the RINR value not exceeding the reference value, the apparatus 2100 may perform operation 811.

In operation 809, the apparatus 2100 may store coordinates (e.g., latitude and longitude) of the corresponding point, in response to the RINR value exceeding the reference value.

In operation 811, the apparatus 2100 may move a scanning location by a distance resolution (e.g., the distance resolution 703) in a direction of a receiving point (e.g., the wireless station 730), in response to the RINR value not exceeding the reference value.

In operation 813, the apparatus 2100 may determine whether an angle of the scanning location exceeds 360 degrees, and may perform operation 817 or operation 815 based on a result of the determination.

In operation 815, in response to the angle exceeding 360 degrees, the apparatus 2100 may determine that the analysis has been performed on all points, and may output the stored coordinates (e.g., coordinates of analysis points) of the interferer. An area obtained by connecting the output coordinates by a line may be set as an analysis area (e.g., the analysis area 750).

In operation 817, in response to the angle not exceeding 360 degrees, the apparatus 2100 may move clockwise by an angular resolution (e.g., the angular resolution 705) and calculate coordinates (e.g., latitude and longitude) of a point separate from the wireless station 730 by the maximum analysis distance 701. After calculating the coordinates of the point, the apparatus 2100 may calculate an RINR value.

Figure 9:
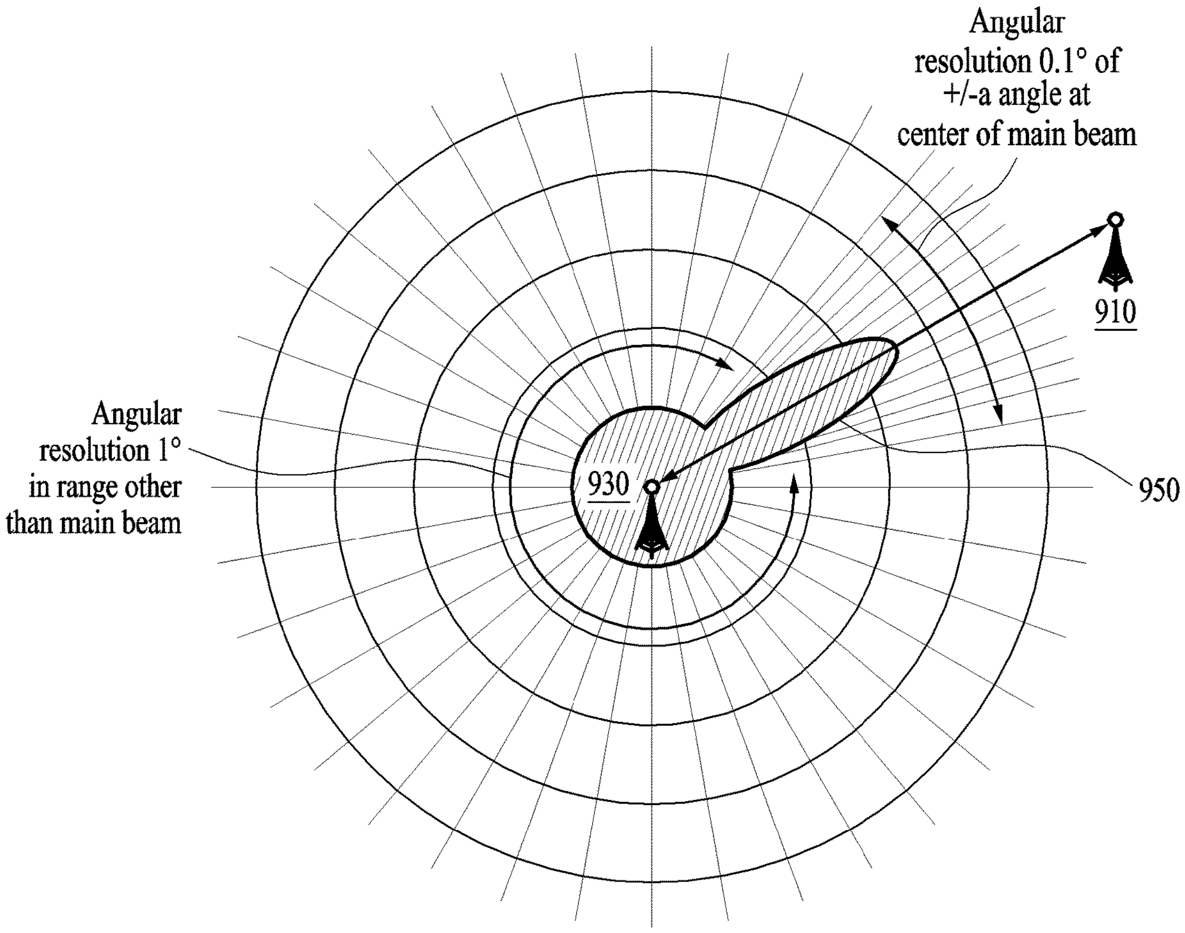
FIG. 9 is a diagram illustrating a circular scanning method to which a non-uniform angular resolution is applied according to an embodiment.

FIG. 9 is a diagram illustrating a circular scanning method to which a non-uniform angular resolution is applied according to an embodiment.

Referring to FIG. 9, according to an embodiment, to improve an issue that there is a difference in analysis resolution based on a distance from a center (e.g., the wireless station 730 in FIG. 7) in the method described above with reference to FIGS. 7 and 8, the apparatus 2100 may use a circular scanning method to which a non-uniform angular resolution is applied. Since a first wireless station (e.g., a wireless station 930) may use a directional antenna having a high directivity mainly with a gain of 30 dBi or greater, an antenna pattern may affect the setting of an analysis area. For example, a surrounding area in a main beam direction of the wireless station 930 may be affected by interference over a relatively great distance compared to a surrounding area not in the main beam direction, and thus a protected area contour may also need to be generated over a great distance. The apparatus 2100 may use a higher analysis resolution (e.g., a smaller angle) within a specific angle (e.g., 0.1 degrees) relative to the main beam direction, and a lower analysis resolution (e.g., a greater angle) for a remainder of the range. The apparatus 2100 may calculate a receiving center angle of a link between the wireless station 930, which is a receiving wireless station, and a transmitting wireless station 910. The apparatus 2100 may calculate an RINR while moving from a point separated by a maximum analysis distance (e.g., the maximum analysis distance 701) in a direction of the calculated angle to the center by a distance resolution (e.g., the distance resolution 703).

The apparatus 2100 may calculate the RINR while moving clockwise by a first angular resolution (e.g., 0.1 degrees), for an area (e.g., a first area) corresponding to the main beam direction. The apparatus 2100 may calculate the RINR while moving by a second angular resolution (e.g., 1 degree) that is greater than the first angular resolution, for an area other than the first area. The second angular resolution may be the same as the angular resolution 705 described above with reference to FIG. 7. The apparatus 2100 may apply different angular resolutions to the first area corresponding to the main beam direction, and for the areas other than the first area in the surrounding area of the wireless station 930. Except for applying the different angular resolutions, the method may be substantially the same as the circular scanning method described above with reference to FIGS. 7 and 8. Based on the calculated value, the apparatus 2100 may set an analysis area (e.g., an analysis area 950). The apparatus 2100 may generate a protected area contour based on a result of calculating all RINR values for the surrounding area. To generate the protected area contour, the apparatus 2100 may need to derive an RINR value with a desired resolution within the analysis area (e.g., the analysis area 950). The apparatus 2100 may set an analysis resolution used to generate the protected area contour to be higher than an analysis resolution used to set the analysis area 950.

Figure 10:
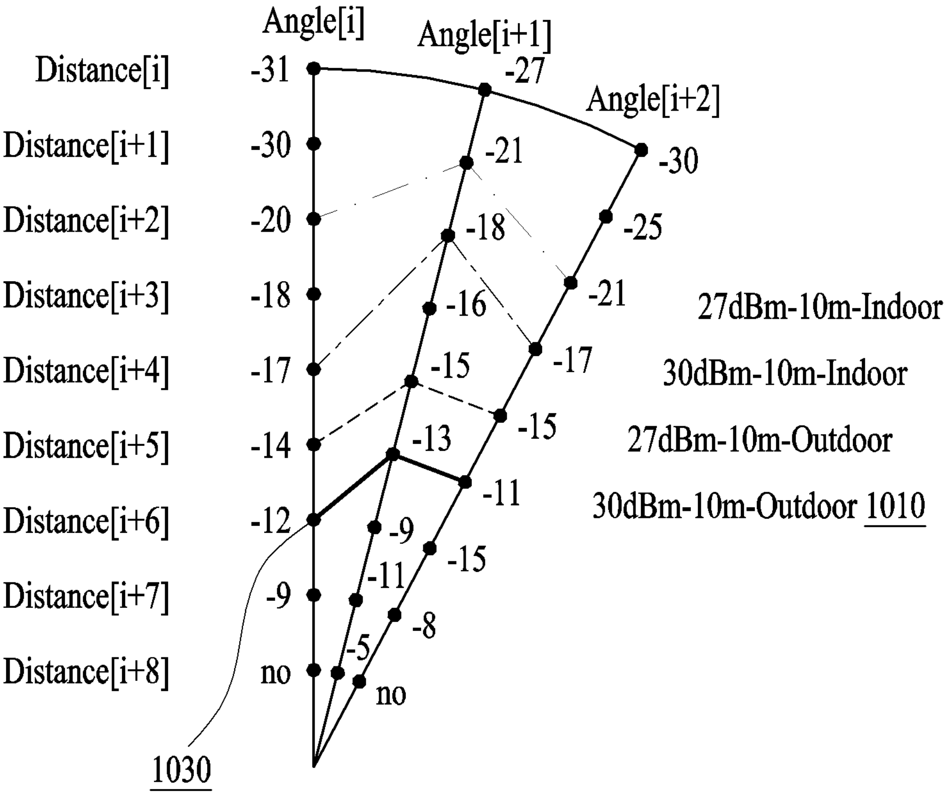
FIG. 10 is a diagram illustrating a method of simultaneously processing a plurality of contours using a circular scanning method according to an embodiment.

FIG. 10 is a diagram illustrating a method of simultaneously processing a plurality of contours using a circular scanning method according to an embodiment.

Referring to FIG. 10, according to an embodiment, an apparatus (e.g., the apparatus 2100 in FIG. 21) performing the method of generating a protected area contour described herein may generate protected area contours for all cases based on an output power, an antenna ground elevation, and whether it is indoors or outdoors, of a second wireless station (e.g., an RLAN). For example, in a case where there are two different output powers of 27 dBm and 30 dBm, two different antenna ground elevations of 10 m and 40 m, and a building transmission loss of 6 dB indoors and indoors, the number of protected area contours finally generated may be 2×2×2=8, and eight protected area contours may be generated for a single receiving source (e.g., a first wireless station), as shown in Table 3 below.

TABLE 3

| Classification | Output power (dBm) | Antenna ground elevation (m) | Indoor/ outdoor |
|---|---|---|---|
| 30 dBm-10 m-Indoor | 30 | 10 | Indoor |
| 30 dBm-10 m-Outdoor | 30 | 10 | Outdoor |
| 30 dBm-40 m-Indoor | 30 | 40 | Indoor |
| 30 dBm-40 m-Outdoor | 30 | 40 | Outdoor |
| 27 dBm-10 m-Indoor | 27 | 10 | Indoor |
| 27 dBm-10 m-Outdoor | 27 | 10 | Outdoor |
| 27 dBm-40 m-Indoor | 27 | 40 | Indoor |
| 27 dBm-40 m-Outdoor | 27 | 40 | Outdoor |

When generating a protected area contour based on the output power, the antenna ground elevation, and the indoor-outdoor classification as shown in Table 3, the apparatus 2100 may need to perform eight similar calculations, which may increase the time required. To simplify the calculations and reduce the time required, the apparatus 2100 may generate a plurality of protected area contours together. For example, the apparatus 2100 may perform calculations to generate protected area contours, for the output power (e.g., 27 dBm and 30 dBm) and the indoor-outdoor classification together. For the antenna ground elevation, the apparatus 2100 may need to perform a calculation for each antenna elevation because a change in the height of an interferer (e.g., the RLAN) may change a receiving antenna gain and a propagation model loss value of the first wireless station. The apparatus 2100 may process a plurality of protected area contours simultaneously in both the linear scanning method and the circular scanning method.

When selecting the linear scanning method to generate a protected area contour, the apparatus 2100 may set the antenna ground elevation of the RLAN to 10 m, the output power to 30 dBm, and the environment to outdoor, and may then calculate and store RINR values of all pixels (e.g., analysis points according to the analysis resolution) within the analysis area. The apparatus 2100 may derive an RINR result by performing an addition or subtraction on RINR results based on the output power and the indoor/outdoor classification. For example, using a target RINR value of −10 dB, the apparatus 2100 may generate a protected area contour corresponding to "30 dBm-10 m-Outdoor." By applying the same RINR result and an RINR value of −13 dB, the apparatus 2100 may generate a protected area contour corresponding to "27 dBm-10 m-Outdoor." By using the indoor building transmission loss of 6 dB and applying an RINR value of −16 dB, the apparatus 2100 may generate a protected area contour corresponding to "30 dBm-10 m-Indoor." By applying an RINR value of −19 dB, the apparatus 2100 may generate a protected area contour corresponding to "27 dBm-10 m-Indoor." The apparatus 2100 may change the antenna ground elevation of the RLAN to 40 m and repeat this calculation process to generate four contours corresponding to the ground elevation of 40 m.

When selecting the circular scanning method to generate a protected area contour, the apparatus 2100 may initialize parameters of the RLAN in the same way as in the linear scanning method. For example, the apparatus 2100 may set the antenna ground elevation of the RLAN to 10 m, the output power to 30 dBm, and the environment to outdoor. When the output power is 30 dBm and the environment is outdoor, an RINR value may be −10 dB which is the highest value. The apparatus 2100 may calculate the RINR value while moving toward the center at Angle[i], and then stop calculating the value when the RINR value at Distance[i+7] is −9 dB, which is greater than −10 dB. The apparatus 2100 may store the coordinates at the immediately preceding step, Distance[i+6], in an i-th Angle array of the 30 dBm-10 m-Outdoor protected area contour. Also, the RINR value of the 27 dBm-10 m-Outdoor protected area contour is −13 dB, which is greater than the value at Distance[i+6], which is −12 dB, and thus the coordinates at Distance[i+5] may be stored in the i-th Angle array. The coordinates at Distance [i+4] may be stored in the i-th array of the 30 dBm-10 m-Outdoor contour, and the coordinates at Distance[i+2] may be stored in the i-th array of the 27 dBm-10 m-Outdoor contour. The apparatus 2100 may move to a maximum analysis distance point of Angle[i+1] and repeat the process described above. After calculating all the angles up to 360 degrees, the apparatus 2100 may change the antenna ground elevation of the RLAN to 40 m and repeat the process described above. The apparatus 2100 may stop calculating at the maximum RINR value to reduce the amount and time of calculation, and may calculate and store the RINR values at all distances to correspond to a reference RINR value that changes in the future and may thereby drive a desired result without additional calculations.

FIG. 11 is a diagram illustrating a method of generating a protected area contour in a polygonal analysis area according to an embodiment.

Referring to FIG. 11, according to an embodiment, an apparatus (e.g., the apparatus 2100 in FIG. 21) performing the method of generating a protected area contour may calculate an INR (e.g., an RINR) to generate a protected area contour in a rectangular analysis area and a polygonal analysis area, in the same way as it calculates an RINR to set an analysis area. The apparatus 2100 may change a distance resolution to a final target value (e.g., 30 m or 1 arcsec), calculate an RINR value for each pixel (e.g., an analysis point based on an analysis resolution), and determine whether the target RINR value (e.g., −10 dB) is exceeded. The apparatus 2100 may generate a final protected area contour based on the polygonal analysis area (e.g., an analysis area 1170). The analysis area 1170 may be the same as the analysis area 670 of FIG. 6B. For example, the analysis area (e.g., the analysis area 1170) may be generated, as indicated in a dashed line, based on a distance resolution of 0.1 degrees of latitude and longitude of an area (e.g., the area 660 in FIG. 6B) determined based on an RINR value. The apparatus 2100 may divide the interior of the analysis area 1170 by a final distance resolution and recalculate the RINR value at the corresponding center. For example, under the assumption that the final distance resolution for generating a protected area contour is 0.05 degrees, the apparatus 2100 may divide the interior of the analysis area 1170 by the final distance resolution of 0.05 degrees again, and generate a final protected area contour based on the RINR value calculated at the center of the division. The apparatus 2100 may generate the final protected area contour (e.g., a protected area contour 1160) by connecting coordinates of points having the values greater than a reference RINR value (e.g., −10 dB), in the same way as performed to generate a polygonal analysis area.

Figure 12:
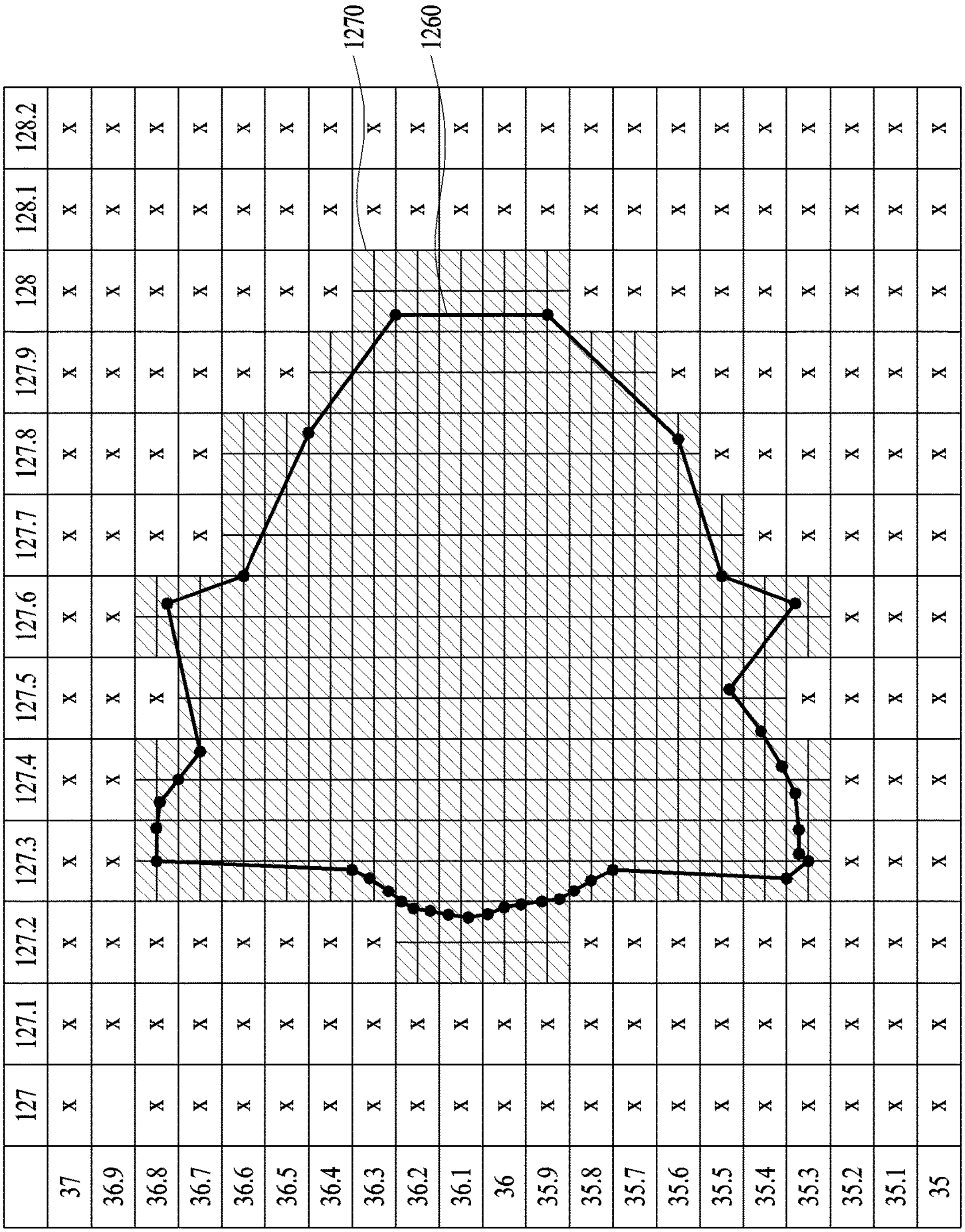
FIG. 12 is a diagram illustrating a method of generating a protected area contour in a circular analysis area according to an embodiment.

FIG. 12 is a diagram illustrating a method of generating a protected area contour in a circular analysis area according to an embodiment.

Referring to FIG. 12, according to an embodiment, an analysis area (e.g., an analysis area 1260 and the analysis area 750 in FIG. 7) set through the circular scanning method described above with reference to FIGS. 7 and 8 may be processed in a similar way of processing a polygonal analysis area (e.g., the polygonal analysis area 1170 in FIG. 11). The analysis area (e.g., the analysis area 1260) set by the circular scanning method may not have precisely delimited latitudes and longitudes of its vertices (e.g., a location of each point). To generate a final protected area contour for a circular analysis area, it may be necessary to newly set the analysis area, as will be described in more detail below with reference to FIG. 13.

Figure 13:
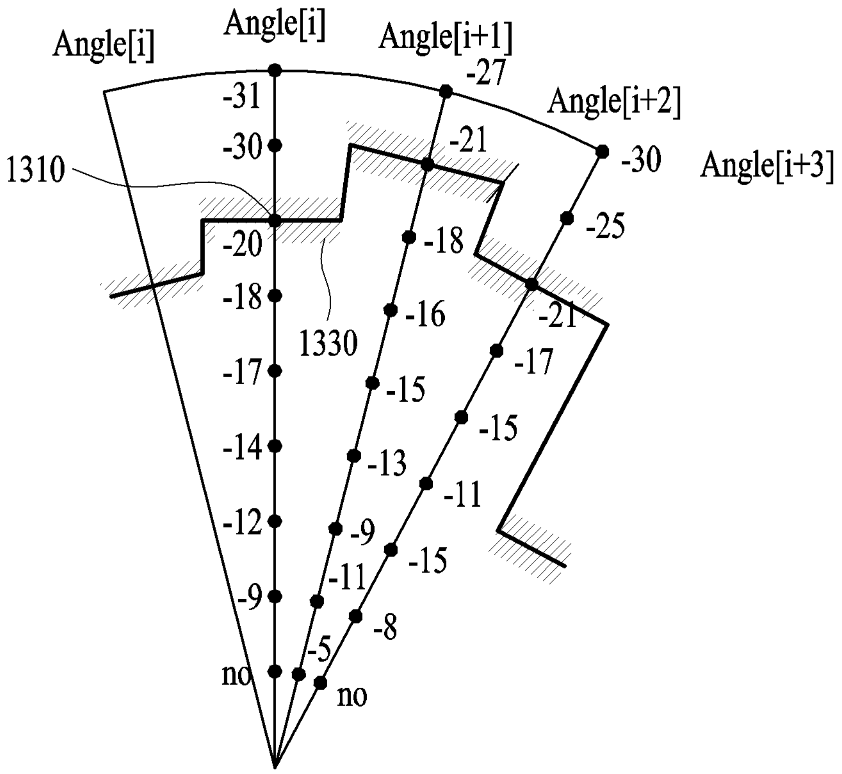
FIG. 13 is a diagram illustrating a method of generating a contour using a circular scanning method according to an embodiment.

FIG. 13 is a diagram illustrating a method of generating a contour using a circular scanning method according to an embodiment.

Referring to FIG. 13, according to an embodiment, an analysis area set by the circular scanning method may be newly set to generate a protected area contour. In this case, an RINR may be calculated in the same way as the method of setting an analysis area using the circular scanning method and processing a plurality of protected area contours. An apparatus (e.g., the apparatus 2100 in FIG. 21) may position latitude and longitude coordinates stored for each angle at a center (e.g., a center 1310) of a trapezoid (e.g., a trapezoid 1330). The apparatus 2100 may set, as a protected area, an area below a point where the center (e.g., the center 1310) of the trapezoid (e.g., the trapezoid 1330) and two sides meet. Since the latitude and longitude coordinates obtained for each angle are stored as coordinates that satisfy a value greater than an RINR value that needs to be satisfied by each protected area contour, the area from the stored coordinate value to the center (e.g., the center 1310) may have an RINR value greater than a target RINR value. Referring to FIG. 13, the number of protected area contour coordinate points generated may be less than or equal to 360/(angular resolution)*2.

Figure 14A:
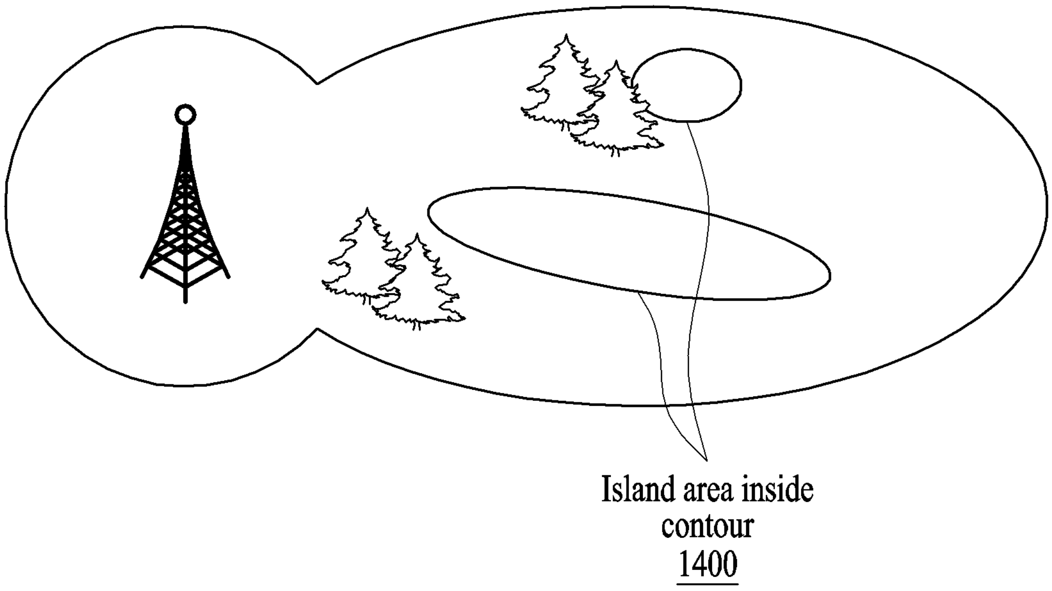
FIGS. 14A and 14B are diagrams illustrating an island area inside a contour generated using a circular scanning method according to an embodiment.
Figure 14B:
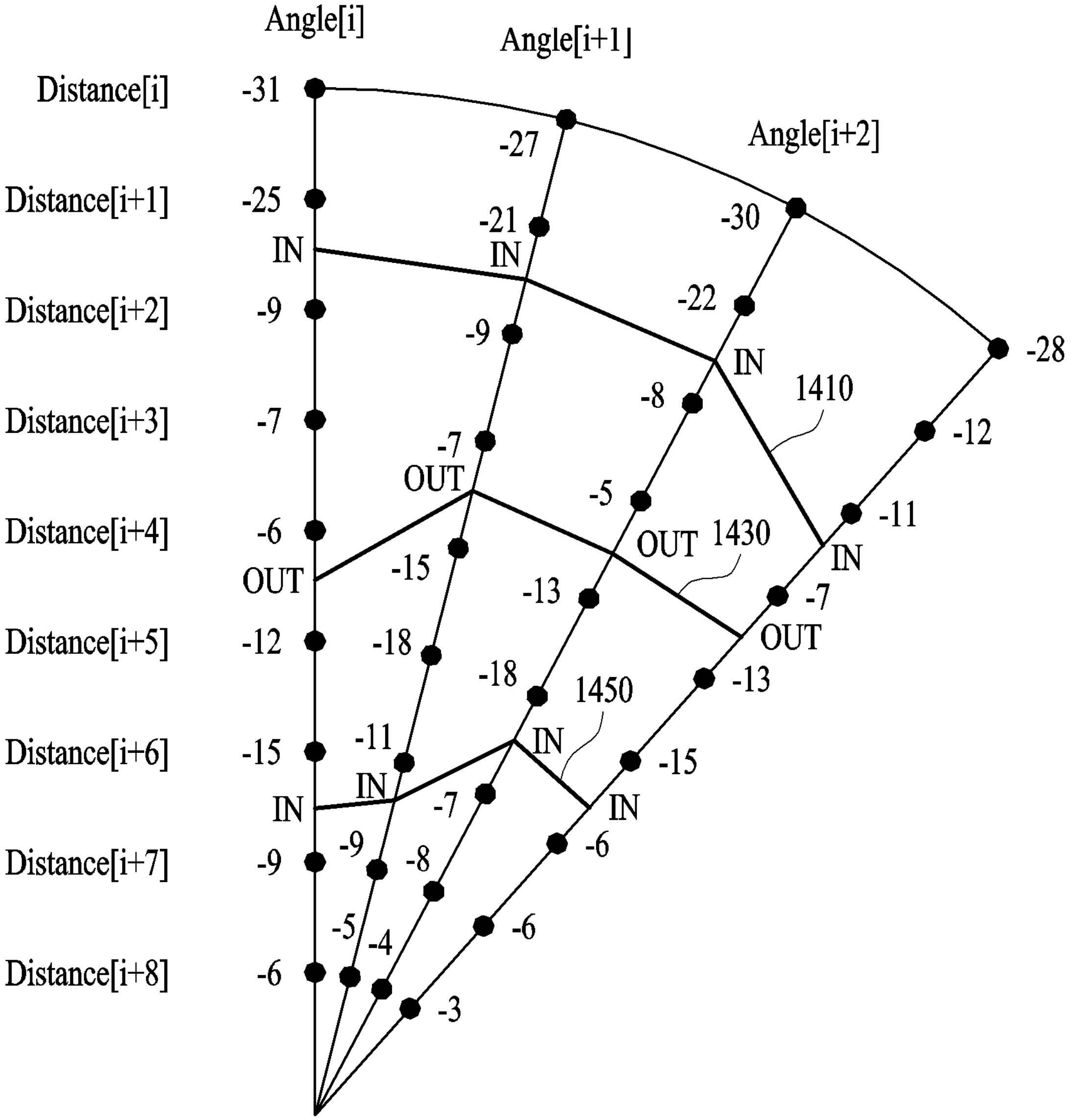

FIGS. 14A and 14B are diagrams illustrating an island area inside a contour generated using a circular scanning method according to an embodiment.

FIG. 14A illustrates the concept of an island area inside a contour according to an embodiment.

Referring to FIG. 14A, according to an embodiment, a protected area contour generated by the circular scanning method may be generated by connecting the largest outline of points that satisfy protection criteria, and thus an internal area in which frequencies are available without an effect of interference may be dismissed. For example, an internal area (e.g., an island area 1400 inside a contour) by actual topography may be available for the use of frequencies, but is dismissed in generating a protected area contour, which may reduce the efficiency of joint use of frequencies.

FIG. 14B illustrates a method of calculating an island area inside a contour according to an embodiment.

Referring to FIG. 14B, according to an embodiment, an apparatus (e.g., the apparatus 2100 in FIG. 21) may employ a method of detecting a point at which an RINR value becomes lower than a reference, to increase the efficiency of frequency sharing with respect to an internal area (e.g., the island area 1400 inside the contour in FIG. 14A). For example, for a specific angle, the apparatus 2100 may store an index, information, and status (e.g., IN) of a point at which a result RINR value as a function of distance exceeds a reference for a protected area from a point at which it is below the reference for a protected area, and an index, information, and status (e.g., OUT) of a point at which the RINR value decreases from the point at which it exceeds the reference for a protected area, and may perform the same process on all the angles. The apparatus 2100 may generate a contour 1410 connecting the outermost IN points, a contour 1430 connecting the innermost OUT points, and a contour 1450 connecting the innermost IN points. Based on the shape of a contour (e.g., the contour 1410, the contour 1430, and the contour 1450), the apparatus 2100 may form an island area. The apparatus 2100 may determine joint use of frequencies in consideration of the formed island area.

Figure 15A:
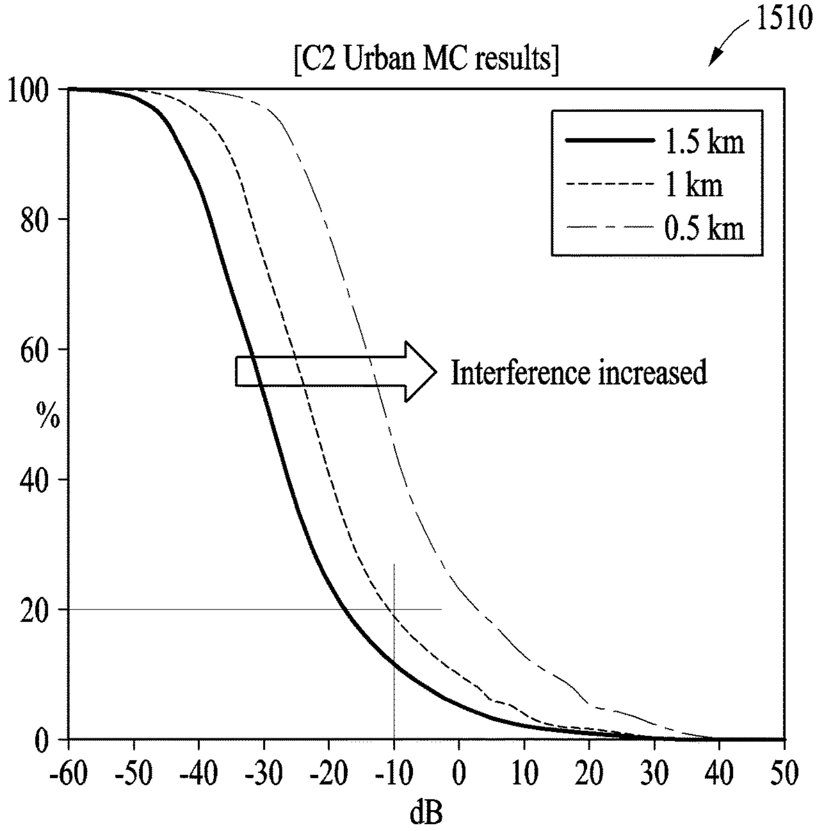
FIGS. 15A and 15B are diagrams illustrating a method of setting a fixed distance exclusion area according to an embodiment.
Figure 15A:
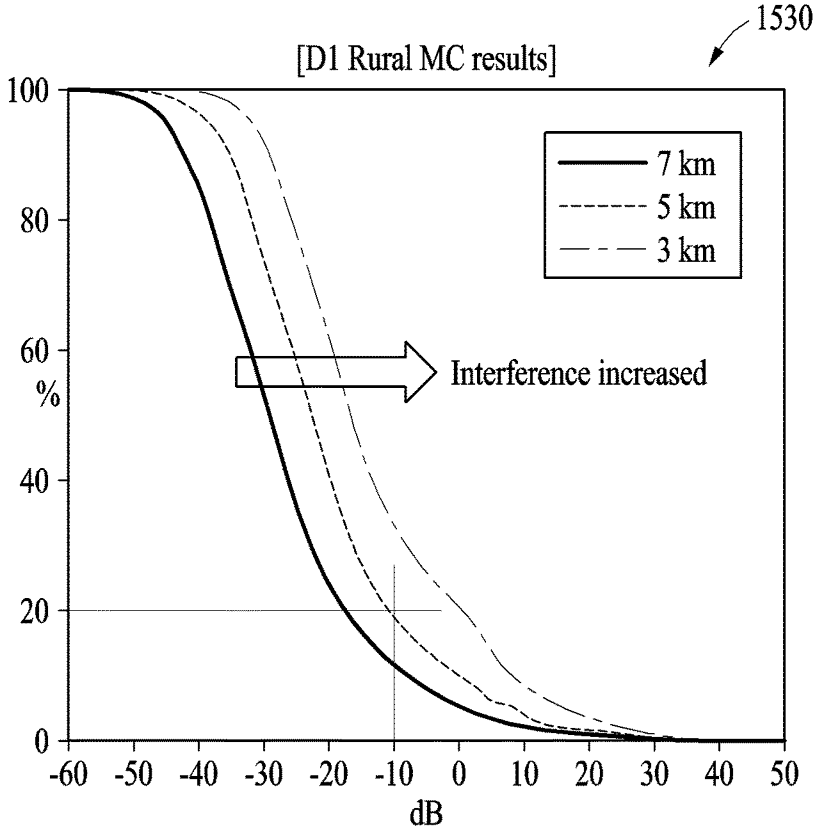
Figure 15B:
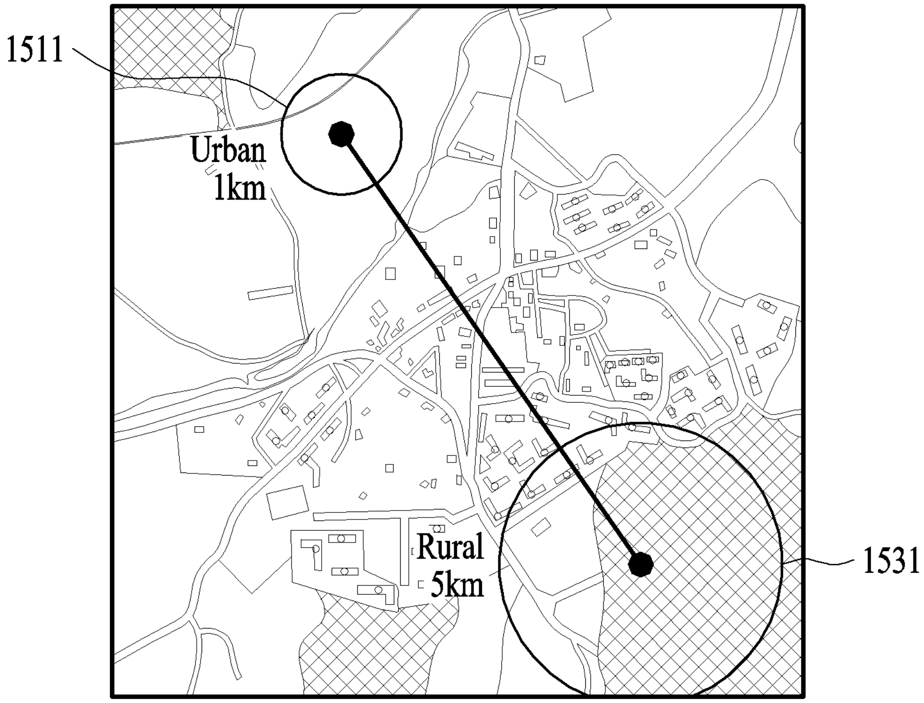
Figure 15B:
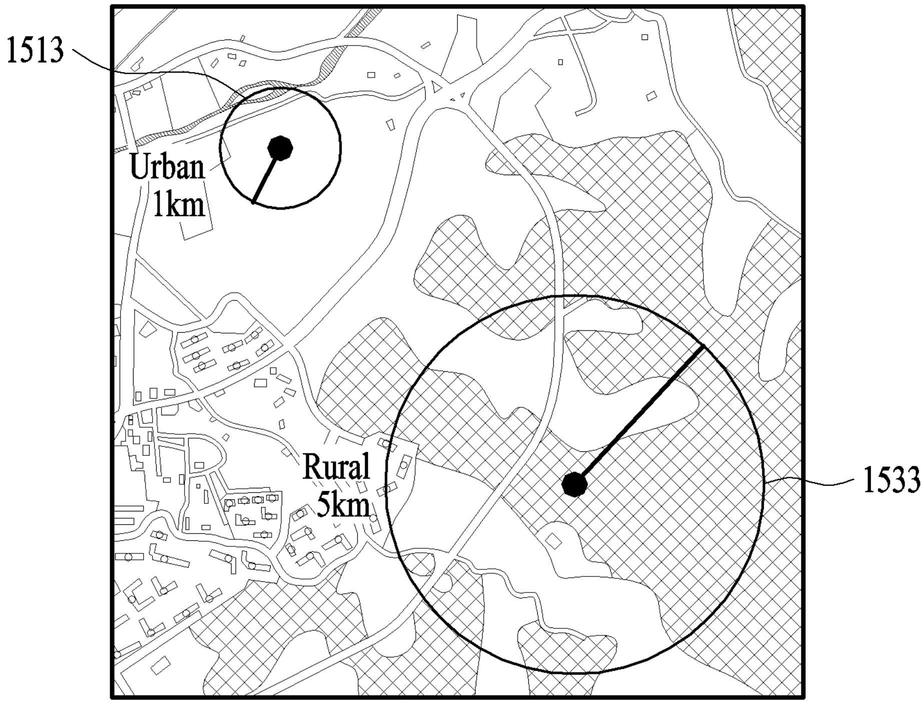

FIGS. 15A and 15B are diagrams illustrating a method of setting a fixed distance exclusion area according to an embodiment.

FIG. 15A illustrates a result of a Monte Carlo simulation by a method of setting a fixed distance exclusion area according to an embodiment.

Referring to FIG. 15A, according to an embodiment, an amount of interference caused by a second wireless station, which is an interferer, on a first wireless station, which is a victim, may be affected by parameters (e.g., a distance between a transmitter and a receiver, topography, and antenna patterns of wireless stations involved). The parameters may be calculated arithmetically by propagation models and interference calculation formulas. In a case of the uncertainty of topography and antenna pattern, a conservative approach may be effective, ensuring that no second wireless station exists within a certain distance relative to the first wireless station. For example, an apparatus (e.g., the apparatus 2100 in FIG. 21) may calculate a separation distance (e.g., a fixed distance) based on morphological information of a location of the first wireless station, using a WINNER II model, which is a popular model for a short-range propagation loss of 5 km or less in a 6 GHz band. Such a propagation loss model used by the apparatus 2100 may be changed to suit the settings, and the separation distance to be calculated may vary accordingly. The apparatus 2100 may classify the location of the first wireless station as an urban, suburban, or rural area based on morphological information at a national scale. An industrial area may be classified as the urban area. The WINNER II model may be classified into models respectively corresponding to the suburban area (e.g., C1), the urban area (e.g., C2), and the rural area (e.g., D1), and may have a line-of-sight (LOS) probability calculated as a function of distance. Table 4 shows basic parameters for performing a Monte Carlo analysis for calculating a fixed distance.

TABLE 4

| | Items | Values |
|---|---|---|
| Transmitting station of interferer | Center frequency (CF) | 6 GHz |
| | Output power | 17 dBm/MHz |
| | Antenna gain and pattern | 0 dBi, omnidirectional pattern |
| | Antenna height | |
| Receiving station of victim | Antenna gain and pattern | 40 dBi, ITU-R F.699 |
| | Antenna height | 25 m |
| | Receiving feeder loss | 3 dB |
| | Receiving noise figure | 3 dB |
| Interference criteria | Reference INR value | −10 dB |
| | Reference CDF value | 20% |

FIG. 15A illustrates results (e.g., a simulation result 1510 and a simulation result 1530) of the Monte Carlo simulation for areas C2 (urban) and D1 (rural) of a radio interference analysis tool to which the WINNER II model in Table 4 is applied. The simulation results show that a distance (e.g., a fixed distance) satisfying a reference RINR value of −10 dB and a CDF of 20% in the area C2 (urban) is 1 km, while in the area D1 (rural), 5 km is derived. For a wireless station located in an urban area, the effect of interference may be excluded by ensuring that no interferer exists within the fixed distance of 1 km. For a wireless station located in a rural area, the effect of interference may be excluded by ensuring that no interferer exists within the fixed distance of 5 km.

FIG. 15B illustrates an example of applying a fixed distance exclusion area setting method according to an embodiment.

Referring to FIG. 15B, according to an embodiment, illustrated is the fixed distance described above with reference to FIG. 15A. For example, a 1 km radius area (e.g., an area 1511) may be derived based on a wireless station located in an urban area of Seoul, and a 5 km radius area (e.g., an area 1531) may be derived based on a wireless station located in a rural area. For another example, a 1 km radius area (e.g., an area 1513) may be derived based on a wireless station located in an urban area of Daejeon, and a 5 km radius area (e.g., an area 1533) may be derived based on a wireless station located in a rural area.

Figure 16:
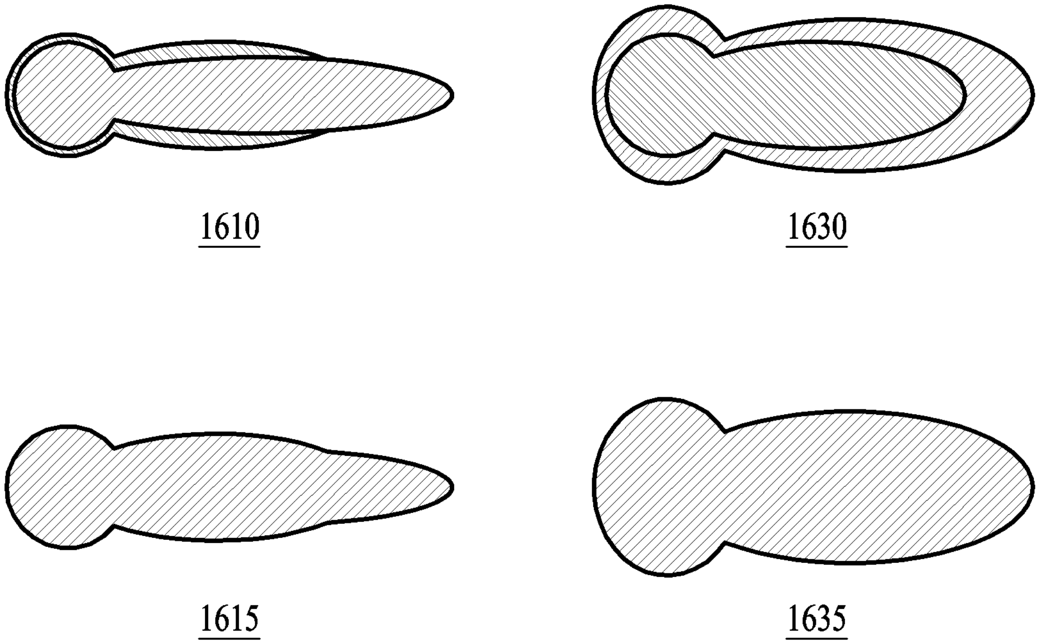
FIG. 16 is a diagram illustrating a method of processing a plurality of contours generated for the same wireless station according to an embodiment.

FIG. 16 is a diagram illustrating a method of processing a plurality of contours generated for the same wireless station according to an embodiment.

Referring to FIG. 16, according to an embodiment, a pair of the same wireless stations (e.g., fixed wireless stations) may form a plurality of links with different transmission and reception parameters. In general, the same antenna may be used to transmit a plurality of channels to the same link, and all may have the same parameters except for a center frequency of a channel. In a case where a secondary device is installed in preparation for a primary device not being operational, an additional antenna and a transmitting and receiving device may be installed on a tower, and the additional antenna and the transmitting and receiving device may also be included in a primary service to be protected. Respective links may generate different protected area contours. For example, in the case of a high antenna gain, a protected area may be formed longer in an aimed direction (e.g., a main beam direction), but may be formed in the same shape as an inner contour of a contour 1610 due to a narrower beam width and a smaller backlobe. In the case of a high antenna height, an expanded shape such as an outer contour of a contour 1630 may be formed due to an effect of a reducing obstruction between a victim (e.g., a first wireless station) and an interferer (e.g., a second wireless station). Although the shape of contours using actual topography is more complex and may not follow the trend described above, contours of similar shape may be generated when the same topography data. Because the primary device and the secondary device are assigned the same channels by nature, a contour, which is the same as a result of determining a protected area contour by the union of two contours, may be generated. For example, in a case where power is available on one link between the primary device and the secondary device at specific coordinates, but unavailable on the other link, this may be due to the fact that a protected area contour is ultimately generated based on the unavailable power. Because applying different protected area contours for different links within the same pair of wireless stations may significantly reduce the overall complexity and efficiency of the system, it may be efficient to allow the same pair of wireless stations (e.g., fixed wireless stations) to have a single contour. Of a plurality of protected area contours, one largest area including the outermost coordinates may be generated as a representative contour. For example, a contour 1615 may be generated by the union of two contours of the contour 1610, and a contour 1635 may be generated by the union of two contours of the contour 1630.

Figure 17:
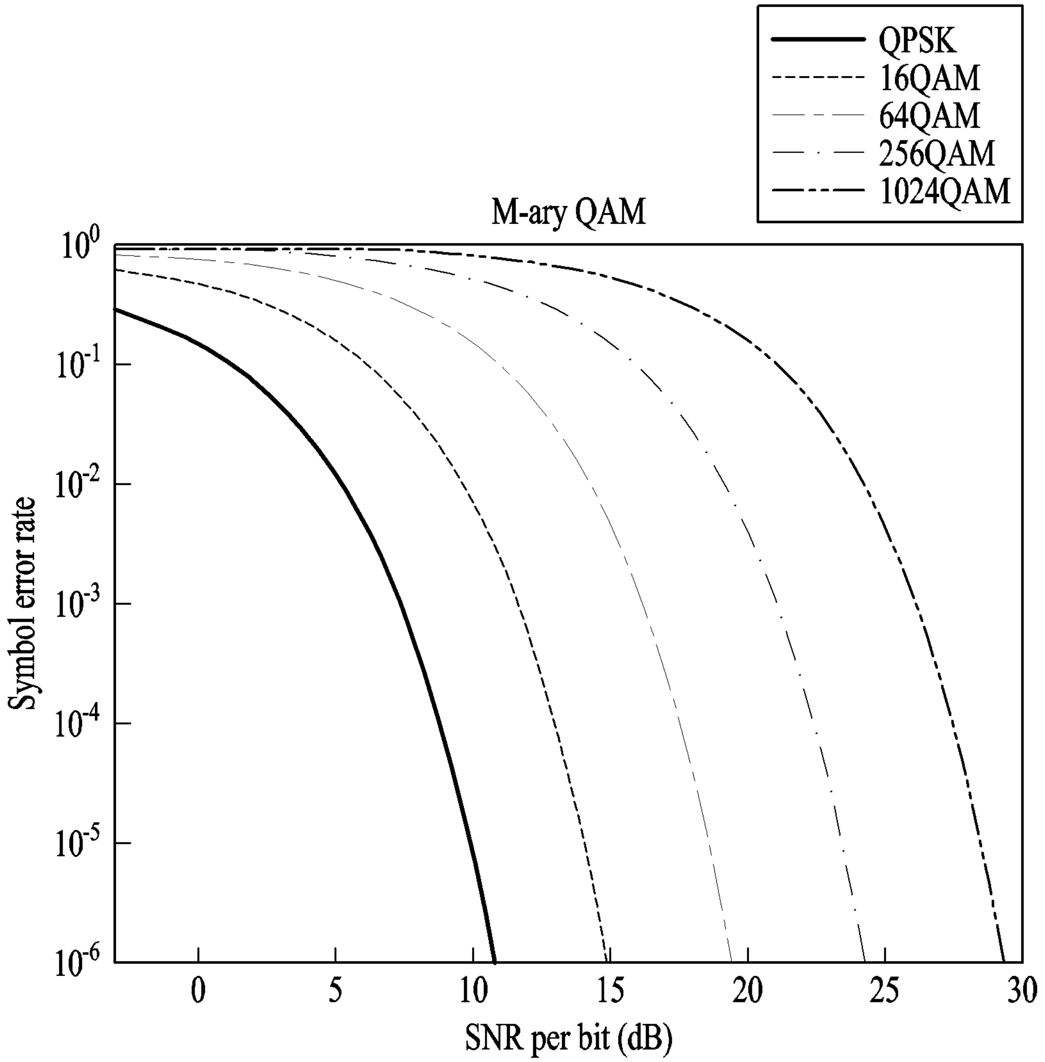
FIG. 17 is a diagram illustrating a method of adjusting received signal level-based protection criteria according to an embodiment.

Accordingly, protected area contours of the same output power for the same wireless station (e.g., fixed wireless station) link may have output power calculated based on a single contour. FIG. 17 is a diagram illustrating a method of adjusting received signal level-based protection criteria according to an embodiment.

Referring to FIG. 17, according to an embodiment, an apparatus (e.g., the apparatus 2100 in FIG. 21) may adjust a reference (or criterion) for generating a protected area based on an INR value (e.g., CINR) to which a desired received signal level of a first wireless station is applied. The method of generating a protected area contour for frequency sharing described above with reference to FIGS. 1 to 16 is based on an INR that defines a relative ratio of interference to noise at a receiver of the first wireless station, without applying the desired received signal level of the first wireless station. In theory, the most efficient way to protect the first wireless station, which is a victim, may be to set a CINR, which is a ratio of noise and interference to a desired received signal (e.g., carrier) of the first wireless station. The desired received signal level of the first wireless station may be a value obtained by adding a fade margin (FM) by multipath and rainfall to a signal-to-noise ratio (SNR) required for the performance of the system itself. In general, an SNR value is determined by the modulation scheme and channel coding of the system, and may be determined to a level that satisfies a BER of 10-6. For example, for 256-QAM, code rate 0.8, the required SNR may be on the order of 22.5 dB, which may vary depending on the characteristics of the system. The FM may vary depending on a required availability, but may typically be set to a value of 20 dB. Equation 2 may be an expression for calculating a minimum required received signal level for a center frequency of 6 GHz, a bandwidth of 30 MHz, and a noise figure of 4 dB.

[Equation 2]

$$N = kTB + NF = -174(\text{dBm}) + 10\log10(30M)(\text{dB}) + 4(\text{dB}) = -95.2\ \text{dBm}$$

$$\text{C\_req} = SNR + \text{FM} + N = 22.5(\text{dB, uncode } SNR) + 20(\text{dB}) - 95.2(\text{dBm}) = -52.7\ \text{dBm}\ \text{I\_req} = -95.2(\text{dBm}) - 10(\text{dB}) = -105.2\ \text{dBm}$$

The minimum received signal level (e.g., I_req) is calculated to be −52.7 dBm, and using-10 dB as a reference INR value, an allowable interference level may be calculated to be −105.2 dBm. A degraded FM reduction may be 0.4 dB.

An actual received signal level (C_RX) of a first wireless station (e.g., a fixed service) with a transmission power (P_FS) of 30 dBm, a transmitting and receiving antenna gain (G_FS_TX, G_FS_RX) of 38 dBi, a link distance of 40 km, and a receiving feeder loss (FL) of 3 dB may be calculated as expressed in Equation 3 below.

$$\text{C\_RX} = \text{P\_FS} + \text{G\_FS\_TX} - PL + \text{G\_FS\_RX} - FL = 30(dBm) + 38(dBi, \text{aline mismatch 3dB}) - 140(\text{dB, 40 km}) + 38(dBi) - 3(\text{dB}) = -37\ \text{dBm} \quad \text{[Equation 3]}$$

As a result of the calculation, when the actual received signal level (C_RX) is −37 dBm, an additional margin of 15.7 dB may be obtained, and a higher interference level may be obtained accordingly. A recalculated allowable interference level required to maintain SNR and FM without causing performance degradation of the system may be calculated as expressed in Equation 4 below.

$$\text{I\_RECAL} = \text{C\_RX} - SNR - \text{FM} + 0.4(\text{dB, fade margin degradation}) = -37 - 22.5 - 20 + 0.4 = -79.1\ \text{dBm} \quad \text{[Equation 4]}$$

There may be a significant difference of 26.1 dB in the interference level between a case where the desired received signal level (e.g. C_RX) is considered and a case where the desired received signal level is not considered. The SNR and FM values required to calculate a required minimum received signal level may be related to system operation, and such items themselves may not be easily obtained from a wireless station DB. To overcome this issue, the SNR and FM values may be set conservatively, and the received signal level and the allowable interference level may be calculated using only the transmission parameters of the wireless station.

For example, referring to the M-ary QAM SNR data in FIG. 17, under the assumption that a required SNR for uncoded 1024-QAM is 29 dB and an FM value is 25 dB, the required received signal level may be calculated as expressed in Equation 5 below.

$$\text{C\_req} = 29 + 25 + -95.2 = -31.2\ \text{dBm} \quad \text{[Equation 5]}$$

The allowable interference level recalculated based on the actual received level (C_RX) of −37 dBm described above may be calculated as expressed in Equation 6 below.

$$\text{I\_RECAL} = -37 - 29 - 25 + 0.4 = -90.6\ \text{dBm} \quad \text{[Equation 6]}$$

The required amount of interference with a link distance considered is −90.6 dBm and the amount of interference calculated in Equation 2 based on an INR is −105.2 dBm, there may be a difference of 14.6 dB. In some specific cases, the recalculated allowable interference level value may be less than the INR-based interference level but, in most cases, may be greater, enabling more efficient frequency sharing.

Figure 18:
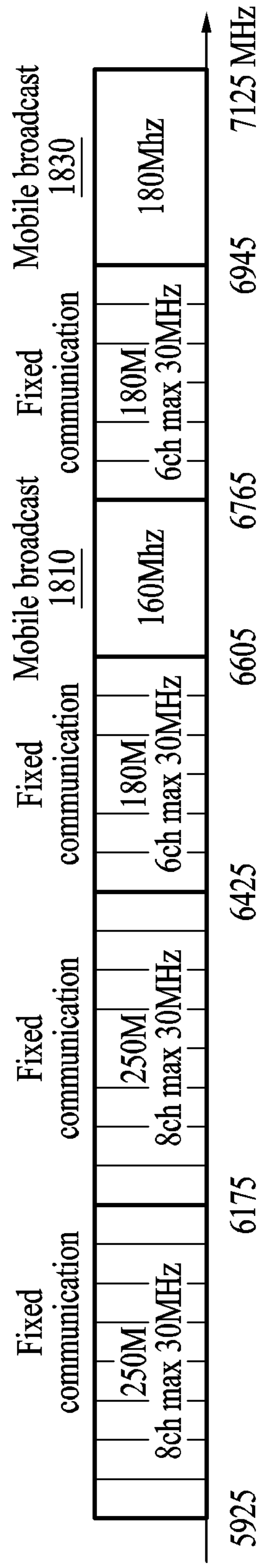
FIG. 18 is a diagram illustrating a mobile relay broadcast service band according to an embodiment.

FIG. 18 is a diagram illustrating a mobile relay broadcast service band according to an embodiment.

Referring to FIG. 18, according to an embodiment, there may be cases in which generating a protected area for a first wireless station within a band for frequency sharing is difficult, or providing a service (e.g., secondary service) of a second wireless station within the protected area is forcibly restricted although generating the protected area is possible. For example, wireless stations for domestic mobile relay broadcast are installed at desired locations as needed, and thus their locations may not be specified and protected areas may not be calculated in advance. In Korea, this may include a band 1810 from 6605 MHz to 6765 MHz and a band 1830 from 6945 MHz to 7125 MHz, and secondary services using the band 1810 and the band 1830 may be prohibited from power spectrum density (PSD)-based use and channel-based use. For example, in the case of the PSD-based use, frequency sharing may be available in a non-overlapping range of unit MHz, and thus the second wireless station may use frequencies to 1 MHz between 6604 MHz and 6605 MHz from 1 MHz between 6765 MHz and 6766 MHz. In the case of the channel-based use, the second wireless station may use frequencies for channels that do not overlap in the bandwidth of each channel at 20/40/80/160/320 MHz. Table 5 shows the number of available channels in a KFS system (e.g., the system 10 in FIG. 1). The number of available channels in the KFS system is similar to that in an automatic frequency control (AFC) system, but one more channel may be available each on a 20 MHz channel and a 320 MHz channel than in the AFC system.

TABLE 5

| | Total available channel number | AFC available channel number | KFS available channel number |
|---|---|---|---|
| 20 MHz | 59 | 41 | 42 |
| 40 MHz | 29 | 20 | 20 |
| 80 MHz | 14 | 9 | 9 |
| 160 MHz | 7 | 4 | 4 |
| 320 MHz (1) | 3 | 1 | 2 |
| 320 MHz (2) | 3 | 1 | 1 |

Figure 19A:
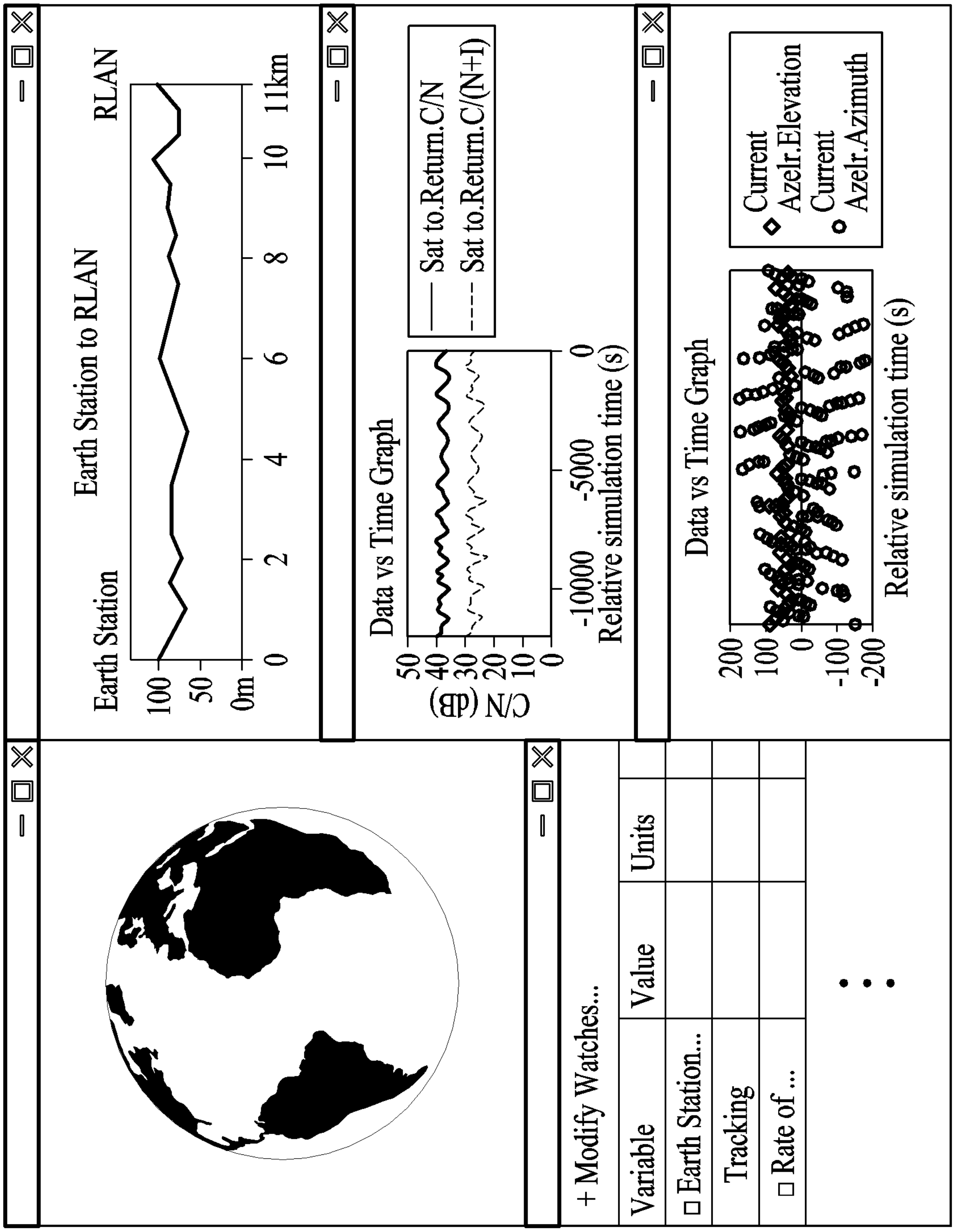
FIGS. 19A and 19B are diagrams illustrating simulation of a protected area of a satellite earth station according to an embodiment.
Figure 19B:
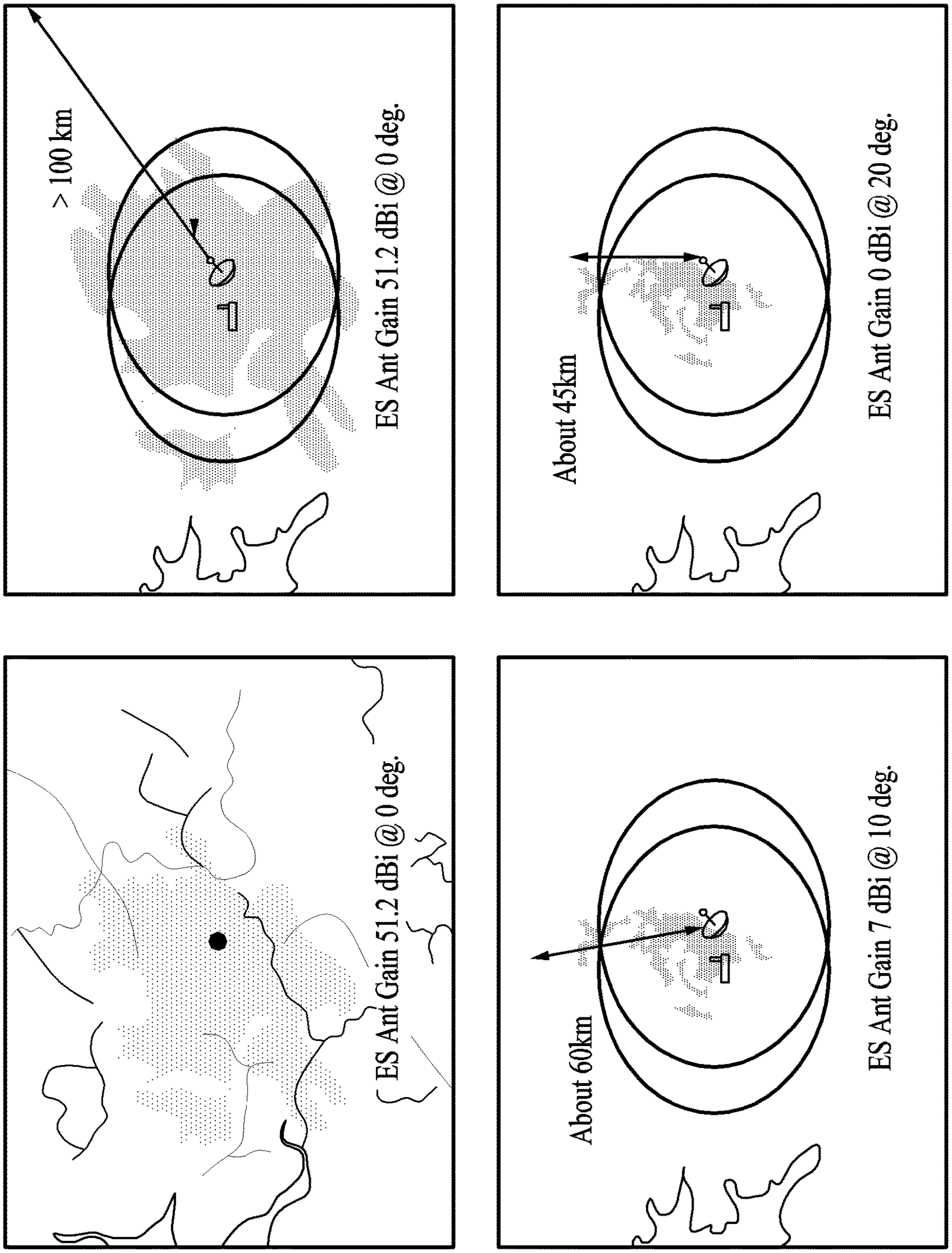

FIGS. 19A and 19B are diagrams illustrating simulation of a protected area of a satellite earth station according to an embodiment.

FIG. 19A illustrates an example of a globalstar low earth orbit satellite simulation according to an embodiment.

Referring to FIG. 19A, according to an embodiment, illustrated is an example simulation performed to calculate an antenna beam tilt angle for a satellite earth station based on the deployment of a domestic globalstar satellite. As shown in FIG. 19A, a 180 MHz band between 6875 MHz and 7055 MHz for satellite-to-earth station communication may be used as a feeder downlink for a globalstar service. Of the 180 MHz band between 6875 MHz and 7055 MHz, a frequency band of 6945 MHz or greater may be prohibited for use by a second wireless station because it is included in a mobile relay broadcast service band. However, it may be necessary to calculate an exclusion area in a 70 MHz band from 6875 MHz to 6945 MHz.

FIG. 19B illustrates an example of a protected area simulation of a satellite earth station according to an embodiment.

Referring to FIG. 19B, according to an embodiment, illustrated is a result of a protected area simulation based on an antenna beam tilt angle relative to an earth station. To protect a satellite-to-earth station downlink from interference, an apparatus (e.g., the apparatus 2100 in FIG. 21) may generate an exclusion area based on a lowest antenna beam tilt angle and a maximum allowable power of the earth station. In the generated exclusion area, using a frequency by a second wireless station may be prohibited. At the tilt angle of 0 degrees, the exclusion area may be as large as 100 km or more, while the exclusion area may be as large as 60 km at 10 degrees as large as 45 km at 20 degrees. Based on the simulation result, the apparatus 2100 may determine a radius of the exclusion area and may also generate a pixel-based protected area.

Figure 20:
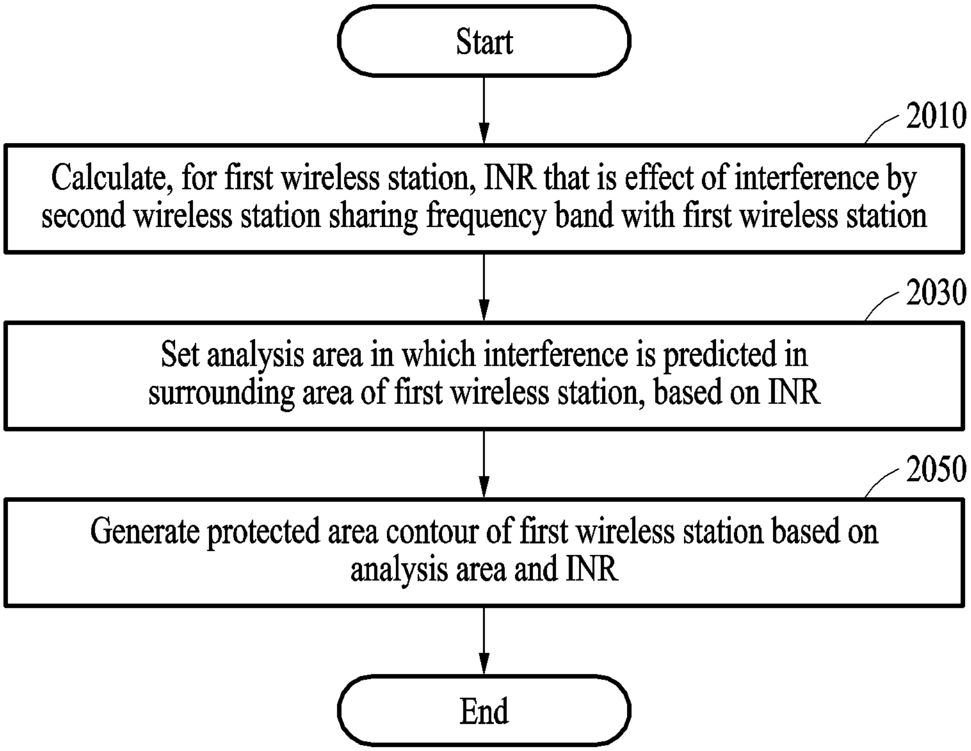
FIG. 20 is a flowchart illustrating a method of generating a protected area contour for frequency sharing according to an embodiment.

FIG. 20 is a flowchart illustrating a method of generating a protected area contour for frequency sharing according to an embodiment.

Referring to FIG. 20, according to an embodiment, operations 2010 through 2050 described below with reference to FIG. 20 may be performed by the apparatus 2100 described herein with reference to FIGS. 1 through 19B and FIG. 21.

In operation 2010, the apparatus 2100 may calculate, for a first wireless station, an INR (e.g., an RINR), which is an effect of interference by a second wireless station sharing a frequency band with the first wireless station.

In operation 2030, the apparatus 2100 may set an analysis area in which interference is predicted to occur in a surrounding area of the first wireless station based on the INR. For example, based on a location of the first wireless station, the apparatus 2100 may select a linear scanning method or a circular scanning method to obtain an INR of the surrounding area of the first wireless station, and may set the analysis area (e.g., a rectangular analysis area, a polygonal analysis area, a circular analysis area, etc.) based on the obtained INR.

In operation 2050, the apparatus 2100 may generate a protected area contour of the first wireless station based on the analysis area and the INR.

Figure 21:
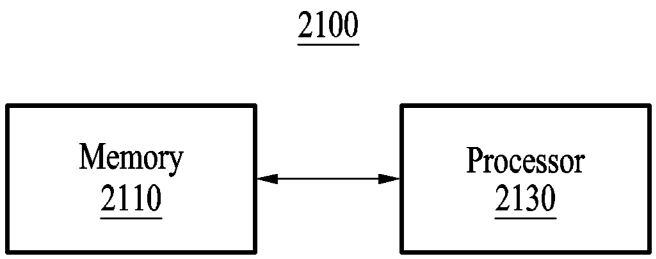
FIG. 21 is a schematic block diagram illustrating an apparatus for generating a protected area contour for frequency sharing according to an embodiment.

FIG. 21 is a schematic block diagram illustrating an apparatus for generating a protected area contour for frequency sharing according to an embodiment.

Referring to FIG. 21, according to an embodiment, the apparatus 2100 may perform the method of generating a protected area contour for frequency sharing, which is described above with reference to FIGS. 1 through 20. The apparatus 2100 may include a memory 2110 and a processor 2130.

The memory 2110 may store instructions (or programs) executable by the processor 2130. For example, the instructions may include instructions for executing operations of the processor 2130 and/or instructions for executing operations of each component of the processor 2130.

The memory 2110 may include one or more computer-readable storage media. The memory 2110 may include non-volatile storage devices, such as, for example, magnetic hard discs, optical discs, floppy discs, flash memory, electrically programmable read-only memories (EPROMs), and electrically erasable programmable read-only memories (EEPROMs).

The memory 2110 may be non-transitory media. The term "non-transitory" may indicate that a storage medium is not implemented as a carrier or propagated signal. However, the term "non-transitory" should not be construed that the memory 2110 is immovable.

The processor 2130 may process data stored in the memory 2110. The processor 2130 may execute computer-readable code (e.g., software) stored in the memory 2110 and instructions caused by the processor 2130.

The processor 2130 may be a hardware-implemented data processing device having a physically structured circuit to execute desired operations. The desired operations may include, for example, code or instructions included in a program.

The hardware-implemented data processing device may include, for example, a microprocessor, a central processing unit (CPU), a processor core, a multi-core processor, a multiprocessor, an application-specific integrated circuit (ASIC), and a field-programmable gate array (FPGA).

The operations performed by the processor 2130 may be substantially the same as the operations performed by the apparatus 2100 to generate a protected area contour, which are described above, and a more detailed and repeated description will thus be omitted here for brevity.

The example embodiments described herein may be implemented using hardware components, software components and/or combinations thereof. A processing device may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as, parallel processors.

The software may include a computer program, a piece of code, an instruction, or some combination thereof, to independently or collectively instruct or configure the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as ROM, RAM, flash memory (e.g., USB flash drives, memory cards, memory sticks, etc.), and the like. Examples of program instructions include both machine code, such as produced by a compiler, and files containing higher-level code that may be executed by the computer using an interpreter.

The above-described hardware devices may be configured to act as one or more software modules in order to perform the operations of the above-described examples, or vice versa.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A method of generating a protected area contour for frequency sharing, the method comprising:

calculating an interference-to-noise ratio (INR) that is an effect of interference with a first wireless station by a second wireless station sharing a frequency band with the first wireless station;

setting an analysis area in which the interference is predicted to occur in a surrounding area of the first wireless station based on the INR; and generating a protected area contour of the first wireless station, based on the analysis area and the INR.

2. The method of claim 1, wherein the INR comprises:

an INR calculated based on a desired received signal level of the first wireless station.

3. The method of claim 1, wherein the setting of the analysis area comprises:

scanning the surrounding area based on a location of the first wireless station;

obtaining the INR of the surrounding area;

detecting a first area in the surrounding area having the INR greater than a predetermined value; and setting the analysis area based on a location of the first area.

4. The method of claim 3, wherein the scanning comprises:

selecting at least one method from a linear scanning method of scanning the surrounding area linearly with respect to the first wireless station and a circular scanning method of scanning the surrounding area radially with respect to the first wireless station, and performing the scanning by the selected method.

5. The method of claim 4, wherein the circular scanning method is a method of uniformly radially scanning the surrounding area based on a predetermined distance resolution and angular resolution, in a circular area with the location of the first wireless station as a center point.

6. The method of claim 5, wherein the angular resolution comprises:

a first angular resolution for a first area in the surrounding area corresponding to a main beam direction of the first wireless station; and a second angular resolution, which is greater than the first angular resolution, for an area in the surrounding area from which the first area is excluded.

7. The method of claim 1, wherein the analysis area comprises:

a rectangular analysis area and a polygonal analysis area.

8. The method of claim 1, wherein the generating of the protected area contour comprises:

in response to the second wireless station comprising a plurality of wireless stations with different ground elevations, simultaneously generating protected area contours of the first wireless station for the plurality of wireless stations.

9. An apparatus configured to generate a protected area contour for frequency sharing, the apparatus comprising:

a memory comprising instructions; and a processor electrically connected to the memory and configured to execute the instructions, wherein, when the instructions are executed by the processor, the processor is configured to control a plurality of operations, wherein the plurality of operations comprises:

calculating an interference-to-noise ratio (INR) that is an effect of interference with a first wireless station by a second wireless station sharing a frequency band with the first wireless station;

setting an analysis area in which the interference is predicted to occur in a surrounding area of the first wireless station based on the INR; and generating a protected area contour of the first wireless station based on the analysis area and the INR.

10. The apparatus of claim 9, wherein the INR comprises:

an INR calculated based on a desired received signal level of the first wireless station.

11. The apparatus of claim 9, wherein the setting of the analysis area comprises:

scanning the surrounding area based on a location of the first wireless station;

obtaining the INR of the surrounding area;

detecting a first area in the surrounding area having the INR greater than a predetermined value; and setting the analysis area based on a location of the first area.

12. The apparatus of claim 11, wherein the scanning comprises:

selecting at least one method from a linear scanning method of scanning the surrounding area linearly with respect to the first wireless station and a circular scanning method of scanning the surrounding area radially with respect to the first wireless station, and performing the scanning by the selected method.

13. The apparatus of claim 12, wherein the circular scanning method is a method of uniformly radially scanning the surrounding area based on a predetermined distance resolution and angular resolution, in a circular area with the location of the first wireless station as a center point.

14. The apparatus of claim 13, wherein the angular resolution comprises:

a first angular resolution for a first area in the surrounding area corresponding to a main beam direction of the first wireless station; and a second angular resolution, which is greater than the first angular resolution, for an area in the surrounding area from which the first area is excluded.

15. The apparatus of claim 9, wherein the analysis area comprises:

a rectangular analysis area and a polygonal analysis area.

16. The apparatus of claim 9, wherein the generating of the protected area contour comprises:

in response to the second wireless station comprising a plurality of wireless stations with different ground elevations, simultaneously generating protected area contours of the first wireless station for the plurality of wireless stations.

17. The apparatus of claim 12, wherein, in response to the circular scanning method being selected, the setting of the analysis area comprises:

detecting a second area in the surrounding area having the INR less than the predetermined value; and setting the analysis area excluding the second area.

18. The apparatus of claim 9, wherein the plurality of operations further comprises:

in response to the second wireless station being a mobile wireless station whose location is not specifiable, restricting use of the frequency band by the second wireless station.

19. The apparatus of claim 9, wherein the generating of the protected area contour comprises:

in response to an aimed orientation of an antenna of the first wireless station not being specifiable, generating the protected area contour based on a beam tilt angle of the antenna.

20. An apparatus configured to generate a protected area contour for frequency sharing, the apparatus comprising:

a memory comprising instructions; and a processor electrically connected to the memory and configured to execute the instructions, wherein, when the instructions are executed by the processor, the processor is configured to control a plurality of operations, wherein the plurality of operations comprises:

determining a fixed distance to exclude a second wireless station which is an interferer, based on morphological information of a location of a first wireless station which is a victim; and generating a contour of an area having the fixed distance as a radius with respect to the first wireless station.

* * * * *